(12) United States Patent
Gostylla et al.

(10) Patent No.: US 11,673,183 B2
(45) Date of Patent: Jun. 13, 2023

(54) FASTENER HANDLING DEVICES FOR FASTENER SETTING MACHINES, AND RELATED METHODS

(71) Applicant: Atlas Copco IAS UK Limited, Flintshire (GB)

(72) Inventors: Wojciech Gostylla, Flintshire (GB); Stuart Edmond Blacket, Flintshire (GB)

(73) Assignee: Atlas Copco IAS UK Limited, Flintshire (GB)

( * ) Notice: Subject to any disclaimer, the term of this patent is extended or adjusted under 35 U.S.C. 154(b) by 0 days.

(21) Appl. No.: 17/556,094

(22) Filed: Dec. 20, 2021

(65) Prior Publication Data

US 2022/0111433 A1 Apr. 14, 2022

Related U.S. Application Data

(63) Continuation of application No. 16/770,096, filed as application No. PCT/GB2018/053527 on Dec. 5, 2018, now Pat. No. 11,241,729.

(30) Foreign Application Priority Data

Dec. 5, 2017 (GB) ..................................... 1720248

(51) Int. Cl.
*B21J 15/32* (2006.01)
*B21J 15/02* (2006.01)

(52) U.S. Cl.
CPC ............. *B21J 15/32* (2013.01); *B21J 15/025* (2013.01)

(58) Field of Classification Search
CPC ........... B21J 15/32; B21J 15/025; B21J 15/10
See application file for complete search history.

(56) References Cited

U.S. PATENT DOCUMENTS 1,839,490 A   1/1932 Moeller
2,186,841 A * 1/1940 Rylander ................. B21J 15/32
                                          470/48

(Continued)

FOREIGN PATENT DOCUMENTS

CN     102873440 B    11/2014
CN     105665607 A     6/2016

(Continued)

OTHER PUBLICATIONS

Henrob, "Innovative Joining Solutions," brochure publicly available at least as early as Nov. 25, 2020 (2 pages).

(Continued)

*Primary Examiner* — Jason L Vaughan
*Assistant Examiner* — Amanda Kreiling
(74) *Attorney, Agent, or Firm* — Michael Best & Friedrich LLP

(57) ABSTRACT

An in-line fastener track selection device comprises a stator having first, second and third fastener conduits; a rotor, rotatably mounted with respect the stator about a rotation axis, and comprising a rotor body and a connection space. The rotor is rotatable between a first position in which the connection space adjoins the first and second fastener conduits, such that, in use, a fastener may pass between the first and second fastener conduits via the connection space, and a second position in which the connection space adjoins the first and third fastener conduits, such that, in use, a fastener may pass between the first and third fastener conduits via the connection space.

27 Claims, 27 Drawing Sheets

(56) References Cited

U.S. PATENT DOCUMENTS

| | | | |
|---|---|---|---|
| 2,366,448 A | 1/1945 | Greene et al. |
| 2,611,911 A | 9/1952 | Graham et al. |
| 2,766,763 A | 10/1956 | Shough |
| 2,978,937 A | 4/1961 | Reynolds et al. |
| 3,868,148 A | 2/1975 | Schultz |
| 4,184,357 A | 1/1980 | Stubbings |
| 4,278,194 A | 7/1981 | Ersoy |
| 4,705,201 A | 11/1987 | Bennett |
| 4,830,547 A | 5/1989 | Boob et al. |
| 5,054,649 A | 10/1991 | Lemaire et al. |
| 5,142,774 A | 9/1992 | Jeffrey |
| 5,172,467 A | 12/1992 | Muller |
| 5,291,645 A | 3/1994 | Aoyama |
| 5,385,434 A | 1/1995 | Quinn et al. |
| 5,465,868 A | 11/1995 | Bonomi |
| 5,566,446 A | 10/1996 | Luckhardt et al. |
| 5,620,520 A | 4/1997 | Duffy et al. |
| 5,697,521 A | 12/1997 | Dixon |
| 5,733,089 A | 3/1998 | Albright |
| 5,813,114 A | 9/1998 | Blacket et al. |
| 6,145,726 A | 11/2000 | Hoof |
| 6,253,448 B1 | 7/2001 | Zieve et al. |
| 6,260,734 B1 | 7/2001 | Auriol et al. |
| 6,328,180 B1 | 12/2001 | Sorensen et al. |
| 6,692,213 B1 | 2/2004 | Butler |
| 6,949,057 B2 | 9/2005 | Everson et al. |
| 6,951,298 B1 | 10/2005 | Coglet et al. |
| 6,964,094 B2 | 11/2005 | Kondo |
| 6,986,440 B2 | 1/2006 | Ammond et al. |
| 7,458,244 B2 | 12/2008 | Dehike et al. |
| 7,810,231 B2 | 10/2010 | Naitoh |
| 7,849,579 B2 | 12/2010 | Craythorn et al. |
| 8,141,761 B2 | 3/2012 | Draht et al. |
| 8,690,037 B2 | 4/2014 | Wenzel et al. |
| 8,695,187 B2 | 4/2014 | Schmidt |
| 8,800,409 B1 | 8/2014 | Wuester et al. |
| 9,120,214 B2 | 9/2015 | Vandenberg |
| 9,162,277 B2 | 10/2015 | Flis et al. |
| 9,387,557 B2 | 7/2016 | Doo et al. |
| 9,409,227 B2 | 8/2016 | Ivo et al. |
| 9,610,632 B2 | 4/2017 | Schug et al. |
| 2005/0051569 A1 | 3/2005 | Ammond et al. |
| 2005/0121015 A1 | 6/2005 | Postorivo, Jr. |
| 2007/0289354 A1 | 12/2007 | Reiter |
| 2009/0279991 A1 | 11/2009 | Dehike |
| 2011/0252927 A1 | 10/2011 | Ota et al. |
| 2011/0289769 A1 | 12/2011 | Skolaude |
| 2011/0290848 A1 | 12/2011 | Wenzel et al. |
| 2012/0017728 A1 | 1/2012 | Schmidt |
| 2012/0067176 A1 | 3/2012 | Ota et al. |
| 2012/0301262 A1 | 11/2012 | Ivo et al. |
| 2013/0071209 A1 | 3/2013 | Schug et al. |
| 2014/0076913 A1 | 3/2014 | Neumeier et al. |
| 2015/0184689 A1 | 7/2015 | Godfrey et al. |
| 2017/0072521 A1 | 3/2017 | Munstermann et al. |
| 2019/0184504 A1 | 6/2019 | Wilkins et al. |
| 2020/0215601 A1 | 7/2020 | Kecici |

FOREIGN PATENT DOCUMENTS

| | | |
|---|---|---|
| DE | 2826418 A1 | 7/1981 |
| DE | 3301243 A1 | 7/1984 |
| DE | 3503408 A1 | 8/1986 |
| DE | 3930999 A1 | 3/1991 |
| DE | 1310953 A1 | 10/1994 |
| DE | 19538812 A1 | 6/1996 |
| DE | 19700271 A1 | 9/1997 |
| DE | 19731344 A1 | 12/1998 |
| DE | 19756798 A1 | 6/1999 |
| DE | 19842103 A1 | 3/2000 |
| DE | 19545672 C2 | 8/2001 |
| DE | 10064241 A1 | 7/2002 |
| DE | 102004011846 A1 | 9/2004 |
| DE | 10335085 A1 | 2/2005 |
| DE | 202005018786 U | 3/2006 |
| DE | 102005015032 A1 | 10/2006 |
| DE | 102009013725 A1 | 9/2010 |
| DE | 102009040764 A1 | 3/2011 |
| DE | 102011103332 A1 | 11/2012 |
| DE | 102011105841 A1 | 12/2012 |
| DE | 102014011608 A1 | 3/2015 |
| DE | 102013000799 B4 | 5/2015 |
| DE | 102015216093 A1 | 3/2017 |
| DE | 102016224559 A1 | 6/2018 |
| EP | 0511093 A1 | 10/1992 |
| EP | 0536779 A1 | 4/1993 |
| EP | 0703037 A1 | 3/1996 |
| EP | 0633825 B1 | 4/1997 |
| EP | 0813463 B1 | 1/2005 |
| EP | 1270113 B1 | 12/2006 |
| EP | 1759785 B1 | 12/2008 |
| EP | 1690613 B1 | 6/2010 |
| EP | 2308613 A1 | 4/2011 |
| EP | 2754512 B1 | 9/2015 |
| EP | 3141318 A1 | 3/2017 |
| EP | 3308905 A1 | 4/2018 |
| FR | 2896173 A1 | 7/2007 |
| GB | 530563 A | 12/1940 |
| GB | 1248411 A | 10/1971 |
| GB | 1303572 A | 1/1973 |
| GB | 2456560 A | 7/2009 |
| JP | S6026520 A | 2/1985 |
| JP | S60137715 A | 7/1985 |
| JP | H0616225 A | 1/1994 |
| JP | H0624416 A | 2/1994 |
| JP | 102873440 A1 | 11/1998 |
| JP | H10291131 A1 | 11/1998 |
| JP | 2012528730 A | 11/2012 |
| JP | 2014515993 A | 7/2014 |
| WO | 8404710 A1 | 12/1984 |
| WO | 1994000257 A1 | 1/1994 |
| WO | 9528242 A1 | 10/1995 |
| WO | 9748510 A1 | 12/1997 |
| WO | 0007751 A1 | 2/2000 |
| WO | 2006103263 A1 | 10/2006 |
| WO | 2007132195 A1 | 11/2007 |
| WO | 2010041018 A1 | 4/2010 |
| WO | 2014009753 A1 | 1/2014 |
| WO | 2016193140 A1 | 12/2016 |
| WO | 2017094324 A1 | 6/2017 |

OTHER PUBLICATIONS

Atlas Copco, "Self-Pierce Riveting Equipment Guide: Servo Systems," brochure publicly available at least as early as Nov. 25, 2020, pp. 1, 6, 7, 9, and 20 (5 pages).

Henrob, "Self-pierce Riveting Products," brochure publicly available at least as early as Nov. 25, 2020, pp. 1 and 16 (2 pages).

International Preliminary Report on Patentability for Application No. PCT/GB2018/053527 dated Jun. 9, 2020 (11 pages).

Search Report issued by the United Kingdom Intellectual Property Office for Application No. 1720248.2 dated May 31, 2018 (4 pages).

International Search Report and Written Opinion for Application No. PCT/GB2018/053527 dated Jun. 3, 2019 (20 pages).

Search Report issued by the United Kingdom Intellectual Property Office for Application No. 1720248.2 dated May 1, 2019 (3 pages).

Japanese Patent Office Notice of Reasons for Rejection for Related Application No. 2020531632 dated Oct. 18, 2022 (16 pages, including an English translation).

Japanese Patent Office Notice of Reasons for Refusal for Related Application No. 2020531570 dated Oct. 4, 1011 (4 pages, including an English translation).

* cited by examiner

FASTENER HANDLING DEVICES FOR FASTENER SETTING MACHINES, AND RELATED METHODS

CROSS REFERENCE TO RELATED APPLICATIONS

This application is a continuation application of U.S. patent application Ser. No. 16/770,096, which is a U.S. National phase application of International Application No. PCT/GB2018/053527 filed Dec. 5, 2018, which claims priority to Application No. GB 1720248.2 filed Dec. 5, 2017, the entire contents of all of which are incorporated by reference herein.

The parent application (U.S. application Ser. No. 16/770, 096), entitled Fastener handling devices for Fastener Setting Machines, and related Methods, relates to a fastener track selection device, a fastener selection device, a fastener setting machine and associated methods. An application (GB1720275.5) having the attorney reference PM345179 GB and entitled Fastener Magazines and Related Supply Systems and Methods has the same filing date as the parent application and was also filed by the applicant in the UK. Likewise, an application (GB1720277.1) having the attorney reference PM345687 GB and entitled Nose Arrangements for Fastener Setting Machines and Related Methods has the same filing date as the parent application and was also filed by the applicant in the UK. Both PM345179 GB and PM345687 GB relate to fastener setting machines and associated methods of the same general type of that of the present invention. The content of PM345179 GB and PM345687 GB are hereby incorporated by reference in their entirety.

SUMMARY OF THE INVENTION

The present application relates to fastener handling devices for handling fasteners for setting by a fastener setting machine, and to related methods. In particular, the present application relates to rivet handling devices for handling rivets for setting by a rivet setting machine, and to related methods. In particular, the rivets may be self-piercing rivets. In addition, this application relates to fastener handling devices incorporated into fastener magazines for storing fasteners, which may be rivets or self-piercing rivets. The rivet handling devices include in-line fastener track selection devices and in-line fastener selection devices.

Various systems and methods for setting fasteners are known which use a bulk-supply apparatus to supply the fasteners to a setting tool. In some systems, the setting tool comprises a nose and a punch for setting the fasteners. The setting tool may be mounted on a support structure such as a C-frame. The C-frame may be mounted on a robotic arm such that a large number of automatic operations per unit time may be accurately carried out by the robot.

Known bulk-supply apparatus includes flexible delivery tubes connected to one or more magazines which locally store a large number of fasteners; often of different shapes and sizes. The magazines may be removable. The fasteners may be supplied to the setting tool via the delivery tubes singularly, or in groups, and are typically supplied from the magazines 'on demand', i.e. when a specific type of fastener is required for fastening a workpiece of a given type.

The nose is generally disposed under the punch, and guides the punch and the fasteners during a setting operation. A die may be provided on the support structure, opposite the nose, to react the force applied by the punch of the setting tool to the fastener and workpiece during a setting operation. In this way, the workpiece is sandwiched between the nose and the die during a setting operation, and the punch is operated to set the fastener.

Systems of the type described above typically feed the fasteners to the nose through suitably profiled flexible delivery tubes which form part of a supply line. The fasteners may be delivered to the setting tool along the supply line through the use of compressed air and/or gravity. Further, supply of the fasteners to the setting tool generally also requires the presence of one or more fastener handling devices along the supply line. These handling devices will generally effect some form of management of the movement of one or more fasteners along the supply line.

Known handling devices may perform one or more operations to start, stop, trap, rotate, translate and/or transfer a fastener so that the required fastener is made available from the relevant fastener storage location to the setting tool for the relevant setting operation. By performing one or more of the above operations, the fastener handling apparatus can separate, hold, release and/or single out one or more fasteners at different stages along the rivet supply line. Ultimately, the required fastener reaches a fastener transfer area located in or adjacent the nose, whence the fastener is transferred to a standby position under the punch, in preparation for the setting operation.

There are several problems associated with the above known fastener handling devices. The fasteners, for example, may jam, tumble or become otherwise dislodged. Further, existing selection mechanisms may be able to handle only a single type of fasteners, or very limited different shapes and/or sizes thereof. Further still, the existing fastener handling devices may be too complex and thus demand high maintenance, repair, manufacture and/or replacement costs. As such, existing fastener handling devices may not be suitable for incorporation into rivet magazines, and particularly removable or replaceable rivet magazines.

It is therefore desirable to improve the design of the existing fastener handling devices. In particular, it is desirable to provide handling devices which can be satisfactorily incorporated into removable magazines for supplying fasteners, including fasteners of different type, size and or shape, particularly to a robot-mounted fastener settling tool.

According to a first aspect of the present invention there is provided an in-line fastener track selection device comprising: a stator having first, second and third fastener conduits; a rotor, rotatably mounted with respect the stator about a rotation axis, and comprising a rotor body and a connection space; the rotor being rotatable between a first position in which the connection space adjoins the first and second fastener conduits, such that, in use, a fastener may pass between the first and second fastener conduits via the connection space, and a second position in which the connection space adjoins the first and third fastener conduits, such that, in use, a fastener may pass between the first and third fastener conduits via the connection space.

In the first position, the rotor body may block the third fastener conduit such that, in use, a fastener cannot pass between the third fastener conduit and the first fastener conduit. In the second position, the rotor body may block the second fastener conduit such that, in use, a fastener cannot pass between the second fastener conduit and the first fastener conduit.

The connection space may be sized so as to, in use, accommodate a plurality of fasteners.

The connection space may be defined by a connection conduit. The connection conduit may be defined between a plurality of walls.

The connection conduit may be curved.

The first and second fastener conduits may be angularly spaced from one another about the rotation axis by about 135°. The first and third fastener conduits may be angularly spaced from one another about the rotation axis by about 135°. In other embodiments the first, second and third conduits may be spaced by any appropriate angular amount.

The connection conduit may comprise first and second ends, and the first and second ends may be angularly spaced from one another about the rotation axis by about 135°. Again, in other embodiments any appropriate angular spacing may be utilised.

The fastener track selection device may further comprise an actuator configured to rotate the rotor relative to the stator.

The actuator may be a rotary actuator or a linear actuator.

The actuator may be configured to rotate the rotor in a first direction to move the rotor from the first position to the second position. The actuator may further be configured to rotate the rotor in said first direction to move the rotor from the second position to the first position.

The rotor body may be generally disk-shaped.

The fastener track selection device may further comprise a biasing means configured to urge the rotor towards the stator in a direction generally parallel to the rotation axis.

According to a second aspect of the invention there is provided a fastener setting machine comprising a fastener track selection device according to the first aspect of the invention, wherein the second and third fastener conduits are configured to be supplied with fasteners from first and second upstream fastener sources, respectively, and wherein the first fastener conduit is configured to supply fasteners to a downstream fastener consumer.

According to a third aspect of the invention there is provided a fastener setting machine comprising a fastener track selection device according to the first aspect of the invention, wherein the second and third fastener conduits are configured to be supply fasteners to at least one downstream fastener consumer, and wherein the first fastener conduit is configured to receive fasteners from an upstream fastener source.

According to a fourth aspect of the invention there is provided a fastener magazine comprising a fastener track selection device according to the first aspect of the invention. The fastener magazine may be a removable fastener magazine.

According to a fifth aspect of the invention there is provided a method of selecting fasteners using an in-line fastener track selection device comprising: a stator having first, second and third fastener conduits; a rotor, rotatably mounted with respect the stator about a rotation axis, and comprising a rotor body and a connection space; the method comprising, rotating the rotor between a first position and a second position; wherein in the first position the connection space adjoins the first and second fastener conduits, such that a fastener may pass between the first and second fastener conduits via the connection space, and wherein in the second position the connection space adjoins the first and third fastener conduits, such that a fastener may pass between the first and third fastener conduits via the connection space.

The method may further comprise moving a fastener between the first and second fastener conduits via the connection space and/or moving a fastener between the first and third fastener conduits via the connection space, using pressurised gas or a vacuum supplied to one or more of the first, second and third conduits. The pressurised gas or vacuum may be maintained whilst the rotor is rotated between the first position and the second position.

Maintaining the pressurised gas or vacuum may reduce the complexity of the operation and/or reduce turbulent flow in the conduits, thereby resulting in smoother movement of fasteners through the relevant conduits.

According to a sixth aspect of the invention there is provided an in-line fastener selection device comprising fastener conduit having a first fastener conduit portion and a second fastener conduit portion, and an escapement mechanism located between the first and second fastener conduit portions; wherein the escapement mechanism has: a first configuration in which a first barrier portion of the escapement mechanism is configured to block the passage of a leading fastener from a first section of the second fastener conduit portion to the first fastener conduit portion; a second configuration in which the first barrier portion of the escapement mechanism is configured to permit the passage of the leading fastener from the first section of the second fastener conduit portion to the first fastener conduit portion, and a second barrier portion of the escapement mechanism is configured to block the passage of a trailing fastener from a second section of the second fastener conduit portion to the first section of the second fastener conduit portion; and a third configuration in which the second barrier portion of the escapement mechanism is configured to permit the passage of the trailing fastener from the second section of the second fastener conduit portion to the first section of the second fastener conduit portion, and the first or second barrier portion of the escapement mechanism is configured to block the passage of the trailing fastener from the first section of the second fastener conduit portion to the first fastener conduit portion.

In embodiments in which in the third configuration the first barrier portion of the escapement mechanism is configured to block the passage of the trailing fastener from the first section of the second fastener conduit portion to the first fastener conduit portion, the first and third configuration may be the same—that is, within the claims, the terms third configuration and first configuration may be interchangeable.

In the first configuration the first barrier portion of the escapement mechanism may be located in a first position and the second barrier portion of the escapement mechanism may be in a second position; and in the second configuration the first barrier portion of the escapement mechanism may be in a third position, and the second barrier portion of the escapement mechanism is in a fourth position; and wherein the device is configured such that the first barrier portion is actuable from the first position to the third position coupled with the second barrier portion being actuated from the second position to the fourth position.

In the second configuration the first barrier portion of the escapement mechanism may be in a third position, and the second barrier portion of the escapement mechanism may be in a fourth position; and in the third configuration the second barrier portion of the escapement mechanism may be configured to block the passage of the trailing fastener from the first section of the second fastener conduit portion to the first fastener conduit portion, and the second barrier portion of the escapement mechanism may be in a fifth position, and the first barrier portion of the escapement mechanism may be in a sixth position, wherein the device may be configured such that the first barrier portion is actuable from the third position to the sixth position coupled with the second barrier portion being actuated from the fourth position to the fifth position; or in the third configuration the first barrier portion of the escapement mechanism may be configured to block the passage of the trailing fastener from the first section of the second fastener conduit portion to the first fastener conduit portion, and the second barrier portion of the escapement mechanism may be in the second position, and the first barrier portion of the escapement mechanism may be in the first position, wherein the device may be configured such that the first barrier portion is actuable from the third position to the first position coupled with the second barrier portion being actuated from the fourth position to the second position.

The device may be configured such that the escapement mechanism oscillates between the second and third configurations.

The escapement mechanism may have a fourth configuration in which the first barrier portion and/or the second barrier portion may be configured to hold the leading fastener or trailing fastener within the escapement mechanism such that the leading fastener or trailing fastener is not free to exit the escapement mechanism.

The fourth configuration may be between the first and second configurations.

In use, the first and second barrier portions may be configured to contact a head portion of the leading and trailing fasteners and/or the first and second barrier portions may be configured to contact a stem portion of the leading and trailing fasteners.

A rotor of the escapement mechanism may rotate about a rotation axis, relative to a stator, between the first and second configurations, and between the second and third configurations.

The rotor may comprise a base from which first and second pins extend in a direction generally parallel to the rotation axis; wherein the first barrier portion comprises the first pin and the second barrier portion comprises the second pin.

The rotor may comprise a base from which a pawl extends in a direction generally parallel to the rotation axis; wherein the first barrier portion comprises a first end of the pawl and the second barrier portion comprises a second end of the pawl.

The pawl may be generally arcuate in cross-section perpendicular to the rotation axis.

The fastener selection device may further comprise an actuator configured to rotate the rotor relative to the stator.

The actuator may be a rotary actuator or a linear actuator.

The escapement mechanism may translate between the first and second configurations, and between the second and third configurations. Said translation may be generally linear.

The escapement mechanism may comprise a barrier assembly comprising a primary barrier and two secondary barrier members. The first barrier portion may comprise the primary barrier, and the second barrier portion may comprise the secondary barrier members.

The primary barrier and secondary barrier members may be spaced along the direction of travel of fasteners along the conduit.

The secondary barrier members may be located either side of the fastener conduit.

The secondary barrier members may be spaced by a distance which is less than a maximum width of a fastener carried by the fastener conduit. The maximum width may be a diameter of a head portion of the fasteners.

The secondary barrier members may be spaced by a distance which is greater than a minimum width of a fastener carried by the fastener conduit. The minimum width may be a diameter of a stem portion of the fasteners.

When the escapement mechanism is in the second configuration, the secondary barrier members may extend into the fastener conduit.

When the escapement mechanism is in the second configuration, the secondary barrier members may be configured to trap the trailing fastener.

When the escapement mechanism is in the second configuration, the secondary barrier members may be configured to form an obstacle in the path of the trailing fastener.

The secondary barrier members may each include a recess, the recess being sized and positioned such that: in the third configuration of the escapement mechanism the recesses of both of the secondary barrier members may define a space in the fastener conduit through which a fastener can pass, such that the fastener can pass from the second section of the second fastener conduit portion to the first section of the second fastener conduit portion; and in the second configuration of the escapement mechanism the recesses of both of the secondary barrier members do not define a space in the fastener conduit through which a fastener can pass, such that the fastener is prevented from passing from the second section of the second fastener conduit portion to the first section of the second fastener conduit portion.

The primary barrier and secondary barrier members may be mounted to an actuation base. This ensures that the primary barrier and secondary barrier members move as one and can therefore, if desired, be actuated by a single actuator.

When the escapement mechanism is in the first configuration, the primary barrier may extend into the fastener conduit.

The secondary barrier members may be biased by a resilient biasing member such that as the escapement mechanism moves from first configuration to the second configuration (by the action of the actuator) the secondary barrier members move from a position in which a fastener in the conduit may pass the secondary barrier members, to a position in which the fastener is blocked from passing the secondary barrier members. Movement of the escapement mechanism from the first configuration to the second configuration may be movement of the primary barrier from a position in which fasteners are prevented from passing the primary barrier to a position in which said fasteners are permitted to pass the primary barrier.

The primary barrier may be biased by a resilient biasing member such that as the escapement mechanism moves from first configuration to the second configuration (by the action of the actuator) the primary barrier moves from a position in which a fastener in the conduit may not pass the primary barrier, to a position in which the fastener is permitted to pass the primary barrier. Movement of the escapement mechanism from the first configuration to the second configuration may be movement of the secondary barrier members from a position in which fasteners are permitted to pass the secondary barrier members to a position in which said fasteners are prevented from passing the secondary barrier members.

According to a seventh embodiment there is provided a fastener setting machine comprising an in-line fastener selection device according to the sixth embodiment.

The in-line fastener selection device may be located at a nose portion of the fastener setting machine, such that the first fastener conduit portion is a standby position at which a fastener sits before it is struck by a punch of the fastener setting machine, and such that the first section of the second fastener conduit portion is a fastener transfer area, and the second section of the second fastener conduit portion is a fastener queuing area.

According to an eighth aspect of the invention there is provided a fastener magazine comprising an in-line fastener selection device according to the sixth aspect of the invention. The fastener magazine may be a removable fastener magazine.

According to a ninth aspect of the invention there is provided a method of selecting a fastener using an in-line fastener selection device comprising fastener conduit having a first fastener conduit portion and a second fastener conduit portion, and an escapement mechanism located between the first and second fastener conduit portions, wherein the method comprises: placing the escapement mechanism in a first configuration in which a first barrier portion of the escapement mechanism blocks the passage of a leading fastener from a first section of the second fastener conduit portion to the first fastener conduit portion; placing the escapement mechanism in a second configuration in which the first barrier portion of the escapement mechanism permits the passage of the leading fastener from the first section of the second fastener conduit portion to the first fastener conduit portion, and a second barrier portion of the escapement mechanism blocks the passage of a trailing fastener from a second section of the second fastener conduit portion to the first section of the second fastener conduit portion; and placing the escapement mechanism in a third configuration in which the second barrier portion of the escapement mechanism permits the passage of the trailing fastener from the second section of the second fastener conduit portion to the first section of the second fastener conduit portion, and the first or second barrier portion of the escapement mechanism blocks the passage of the trailing fastener from the first section of the second fastener conduit portion to the first fastener conduit portion.

The method may further comprise moving a fastener between the first conduit portion and the second conduit portion via the escapement mechanism, using pressurised gas or a vacuum supplied to the first or second conduit portions. The pressurised gas or vacuum may be maintained whilst the escapement mechanism is moved between the first, second and third configurations.

According to a tenth aspect of the invention there is provided a fastener setting machine comprising a conduit along which fasteners are configured to travel, and an air amplifier located along the conduit, the air amplifier being configured to inject compressed air into the conduit via a nozzle so that the injected compressed air flows in a downstream direction towards a downstream portion of the conduit, said compressed air pulling air from an upstream portion of the conduit an towards said downstream portion, thereby propelling said fasteners along the conduit from the upstream portion of the conduit to the downstream portion of the conduit.

The use of an air amplifier to propel fasteners along a conduit, such as a feed conduit, has several advantages. The use of an air amplifier is more efficient (i.e. consumes less energy and air) as compared to known methods. In addition, using an air amplifier provides flexibility to position the arrangement used to propel the fastener at any location along the conduit.

The conduit may have a generally T-shaped cross-section perpendicular to the direction in which said fasteners are propelled along the conduit.

The fasteners may be rivets.

The nozzle may comprise a nozzle chamber which surrounds a portion of the conduit intermediate said upstream and downstream portions. The nozzle chamber allows the compressed air which drives the air amplifier to be supplied to the nozzle whilst at the same time ensuring that as much air as possible can contact a fastener moving through the nozzle chamber to thereby propel it.

The air amplifier may include at least one guide member located in said nozzle chamber, said at least one guide member may be shaped and positioned so as to be configured to guide a fastener through the nozzle chamber from said upstream portion of the conduit to said downstream portion of the conduit.

In this way the fastener can be guided through the air amplifier without the air amplifier providing any kind of obstruction to the movement of the fasteners through to air amplifier.

Said at least one guide member may comprise a plurality of rails which are configured to contact said fastener, in use, so as to guide said fastener through the nozzle chamber from said upstream portion of the conduit to said downstream portion of the conduit.

First and second rails may be configured to contact a shoulder portion of said fasteners.

A magazine portion of the fastener setting device comprises said upstream portion of the conduit, and wherein a nose portion of the fastener setting device comprises said downstream portion of the conduit.

The upstream portion of the conduit may be vented to atmosphere. This reduces the amount of sealing required for the fastener propelling arrangement to operate, thereby reducing the cost and complexity of any machine of which the air amplifier forms part.

According to an eleventh aspect of the invention there is provided a method of manufacturing a product, the method comprising fastening together two or more layers of a workpiece using a fastener setting machine according to any of the second, third or seventh aspects of the invention, a fastener magazine according to the fourth or eighth aspects of the invention, or a method according to the fifth or ninth aspects of the invention.

The product may be a vehicle.

It will be appreciated that, where appropriate, any of the optional features discussed above in relation to one of the aspects of the invention, may equally be applied to any of the other aspects of the invention. The conduit may have a T-shaped cross section suitable for carrying rivets.

BRIEF DESCRIPTION OF THE DRAWINGS

Specific embodiments of the present invention will now be described, by way of example only, with reference to the accompanying drawings in which.

DETAILED DESCRIPTION

Figure 1:
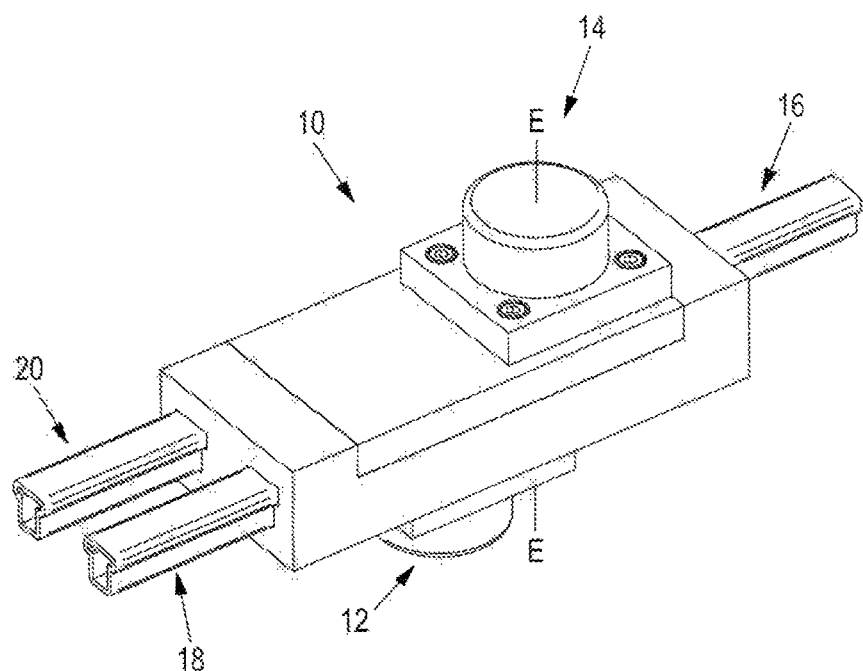
FIG. 1 shows a schematic perspective view of a rivet handling device comprising a rivet track selection device and a rivet selection device according to embodiments of the invention.

FIG. 1 shows a schematic perspective view of a rivet handling device 10. The rivet handling device comprises an in-line rivet track selection device 12 and an in-line rivet selection device 14. The rivet handling device 10 is shown in isolation, but, in some embodiments, will form part of a rivet setting device. The rivet handling device 10 includes first, second and third rivet conduits (16, 18, and 20 respectively). As can be seen most clearly in relation to the second and third rivet conduits 18, 20, the rivet conduits in the present embodiment all have a generally T-shaped profile which generally corresponds to the cross-sectional shape of the rivets which are carried by the rivet conduit. Of course, in other embodiments, which may relate to different types of fastener, the conduits may have any appropriate cross-sectional shape.

Figure 2:
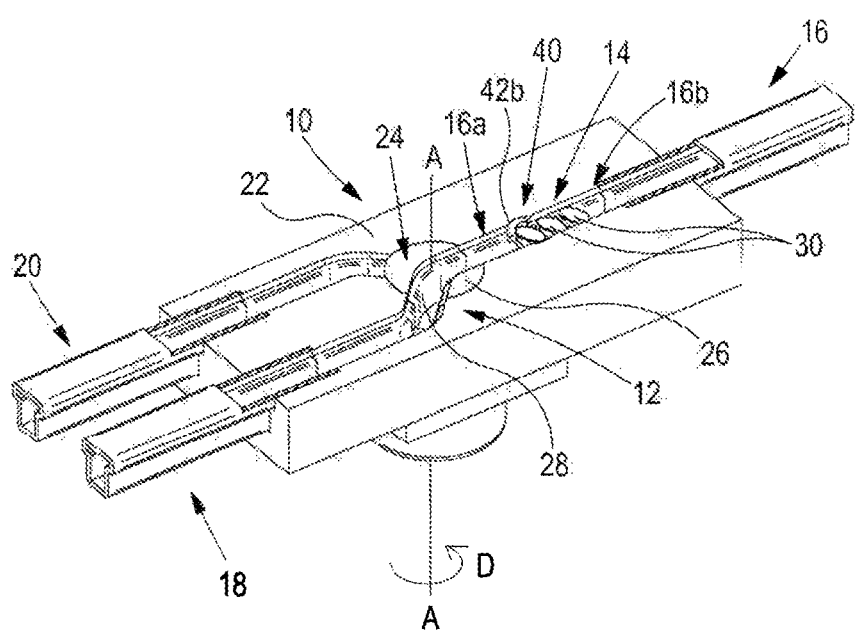
FIGS. 2 to 6 show schematic cut-away and cross-sectional views of the rivet handling device of FIG. 1.

FIG. 2 shows a further schematic view of the rivet handling device 10 shown in FIG. 1, with an upper portion of the device removed so as to show the internal workings of the handling device 10.

The functioning of the in-line rivet track selection device 12 and in-line rivet selection device 14 of the rivet handling device 10 will now be discussed separately.

The in-line rivet track selection device 12 comprises a main body 22 which constitutes a stator. As previously discussed, the main body 22 includes first, second and third rivet conduits 16, 18 and 20.

The rivet track selection device 12 further comprises a rotor 24 rotatably mounted with respect to the stator 22 about a rotation axis A. The rotor 24 comprises a rotor body 26 and a connection space 28.

Figure 5:
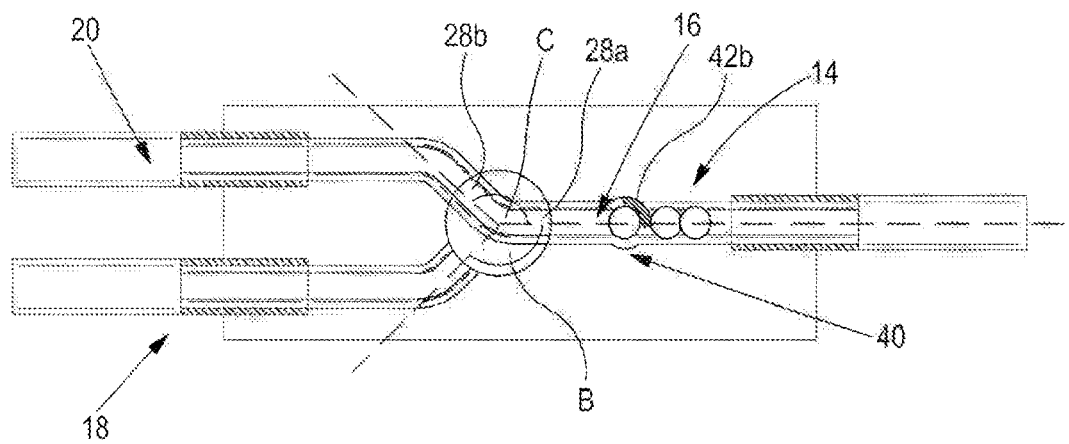
Figure 6:
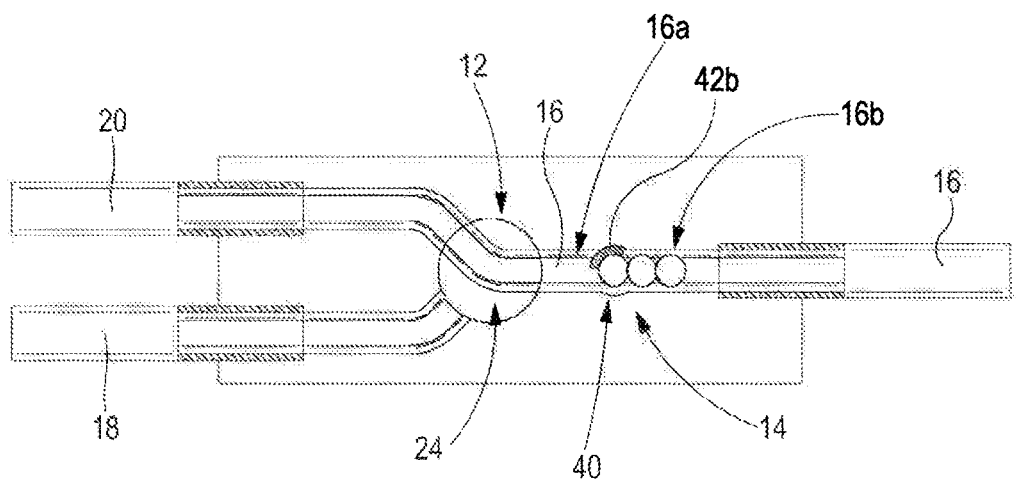

The rotor 24 is rotatable between a first position shown in FIG. 2 and a second position as shown in FIGS. 5 and 6. In the first position the connection space 28 joins the first and second rivet conduits 16, 18, such that, in use, a rivet may pass between the first and second fastener conduits 16, 18 via the connection space 28. In the second position the connection space 28 adjoins the first and third rivet conduits 16, 20, such that, in use, a rivet may pass between the first and third rivet conduits 16, 20 via the connection space 28.

In this way, the rivet track selection device is capable of selecting whether a rivet can travel between the first and second fastener conduits or between the first and third fastener conduits. As will be discussed in more detail later, this may be of use when it is desirable to supply a rivet from a single rivet supply location to two downstream rivet consumers, or to supply rivets from two different rivet supply locations to a single downstream rivet consumer.

In the first position, the rotor body 26 blocks the third rivet conduit 20 such that, in use, a fastener cannot pass between the third fastener conduit 20 and the first fastener conduit 16. In addition, in the second position of the rotor 24 the rotor body 26 blocks the second rivet conduit 18 such that, in use, a rivet cannot pass between the second fastener conduit 18 and the first rivet conduit 16. An advantage of blocking a conduit which should not be in use when the rotor of the fastener track selection device is in a particular configuration is that any fastener or otherwise which is located in the unused conduit cannot find its way into the connection space and therefore cannot contaminate the rivet supply line.

As can be seen from the figures, the connection space 28 is sized so that it can accommodate a plurality of fasteners 30. In other embodiments, the connection space may be sized so as to accommodate only a single rivet.

The connection space 28 is defined by a connection conduit in the rotor body 26. The connection conduit is defined by a plurality of opposing walls. In other embodiments the connection space may be defined by any suitable structure. For example, the connection space may be defined by a number of connecting wires, rails or the like.

In the present embodiment, the connection conduit which defines the connection space 28 is curved. In particular, the connection conduit has a generally arrow-head or chevron shape. In other embodiments the connection conduit may have any appropriate shape. An appropriate shape is one which is capable of adjoining each of the first, second and third rivet conduits when required; and one which enables the rivets (or other fastener) to pass along the connection conduit.

As can be seen most clearly in FIG. 5, the first and second rivet conduits 16, 18 are angularly spaced from one another about the rotation axis A by 135 degrees as indicated by the reference B. Likewise, the first and third rivet conduits, 16, 20 are angularly spaced from one another about the rotation axis A by about 135 degrees as indicated by reference C. In other embodiments the angular spacing between the conduits may be any appropriate spacing.

The connection conduit comprises first and second ends 28a, 28b. The first and second ends 28a, 28b are angularly spaced about the rotation axis A by about 135 degrees (again indicated by C).

Figure 4:
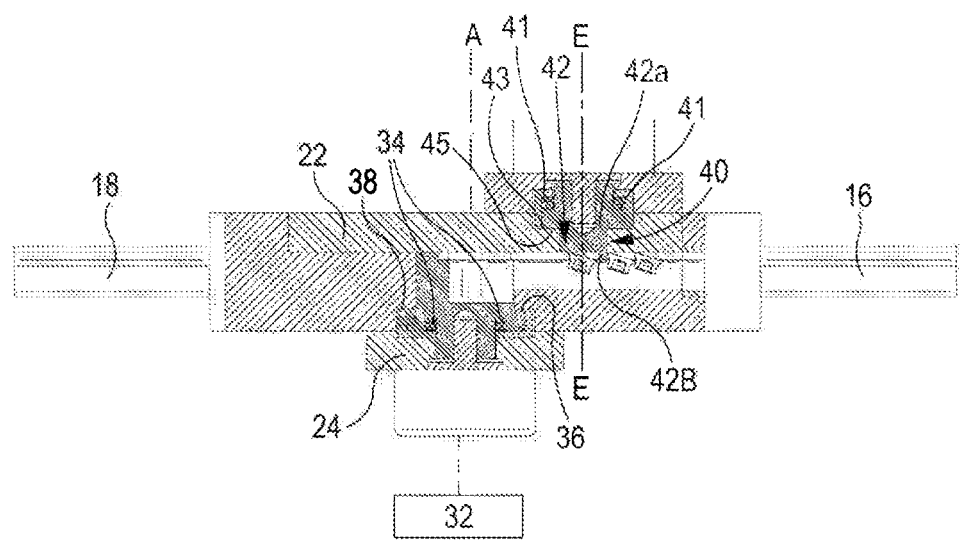

As seen best in FIG. 4, the rivet track selection device comprises an actuator 32 configured to rotate the rotor 24 relative to the stator 22. In particular, the actuator 32 is mechanically linked to the rotor so that it can drive rotation thereof. Any appropriate actuator may be used, provided it is capable of driving the rotor between the first and second positions. For example, the actuator may be a rotary actuator or a linear actuator which converts a linear input to rotation.

In use, the actuator 32 is configured to rotate the rotor 24 in a first direction D to move the rotor from the first position as shown in FIG. 2 to the second position as shown in FIGS. 5 and 6. In particular, the rotor is rotated by about 225 degrees clockwise. Similarly, the actuator is further configured to rotate the rotor in said first direction D to move the rotor from the second position as shown in FIGS. 5 and 6 to the first position as shown in FIG. 2. Said rotation is a rotation of about 135 degrees clockwise. Consequently, as the rotor undergoes a complete rotation of 360 degrees, the rotor will move from the first position to the second position and then from the second position to the first position.

In other embodiments the actuator may be configured to rotate the rotor in an anti-clockwise direction (opposite to direction D) to move the rotor from the first position as shown in FIG. 2 to the second position as shown in FIGS. 5 and 6. In particular, the rotor may be rotated by about 135 degrees anti-clockwise. The actuator may then further be configured to rotate the rotor in said first direction D to move the rotor from the second position as shown in FIGS. 5 and 6 to the first position as shown in FIG. 2. Said rotation is a rotation of about 135 degrees clockwise. It follows that as the rotor moves between the first and second positions multiple times it oscillates by 135 degrees in the clockwise and anti-clockwise directions. In such embodiments the actuator and/or rotor may include stops which define the limits of rotation of the rotor in both the clockwise and anti-clockwise directions. Such an arrangement may require less positional accuracy of the actuator and therefore make the system less susceptible to potential misalignment.

A benefit of configuring the actuator so that rotates in the same direction so as to move the rotor from the first position to the second position, and from the second position to the first position is that the actuator only needs to rotate in a single direction. Consequently, the actuator can be of relatively simple construction. Additionally, it may be that, by only requiring the actuator to cause rotation in a single direction, this puts less strain on the actuator and, therefore, the actuator, and hence the rivet track selection device, may have an increased operating lifetime.

It will be appreciated that, although within the present embodiment the actuator is configured to rotate in the same direction when moving the rotor from the first position to the second position, and when moving the rotor from the second position to the first position, in other embodiments the actuator may be configured to rotate the rotor in opposite directions.

In the present embodiment the rotor body 26 is generally disk-shaped. This is advantageous because, if the disk has a centre axis which is coaxial with the axis of rotation or the rotor, then the rotor can rotate within a generally circular cavity within the main body/stator of the device unhindered.

As seen best in FIG. 4, the device includes biasing means 34 in the form of compression springs. The biasing means 34 are configured to urge the rotor 24 towards the stator 22 in a direction generally parallel to the rotation axis A. In particular, the biasing means 34 urges the generally radial face 36 of the rotor against the adjacent generally radial face 38 of the stator 22. This creates a seal between the rotor and the stator. Such a seal may be useful in applications whereby the fasteners are propelled along the conduits of the supply line using compressed gas, such as compressed air or the like. In this situation, any leakage of the compressed gas between the rotor and the stator would result in a loss of operating performance of the device of which the fastener track selection device forms part. A loss of gas may result in a loss or reduction of propulsion speed of the fasteners along the supply line of the fastener device of which the fastener track selection device forms part.

Figure 9:
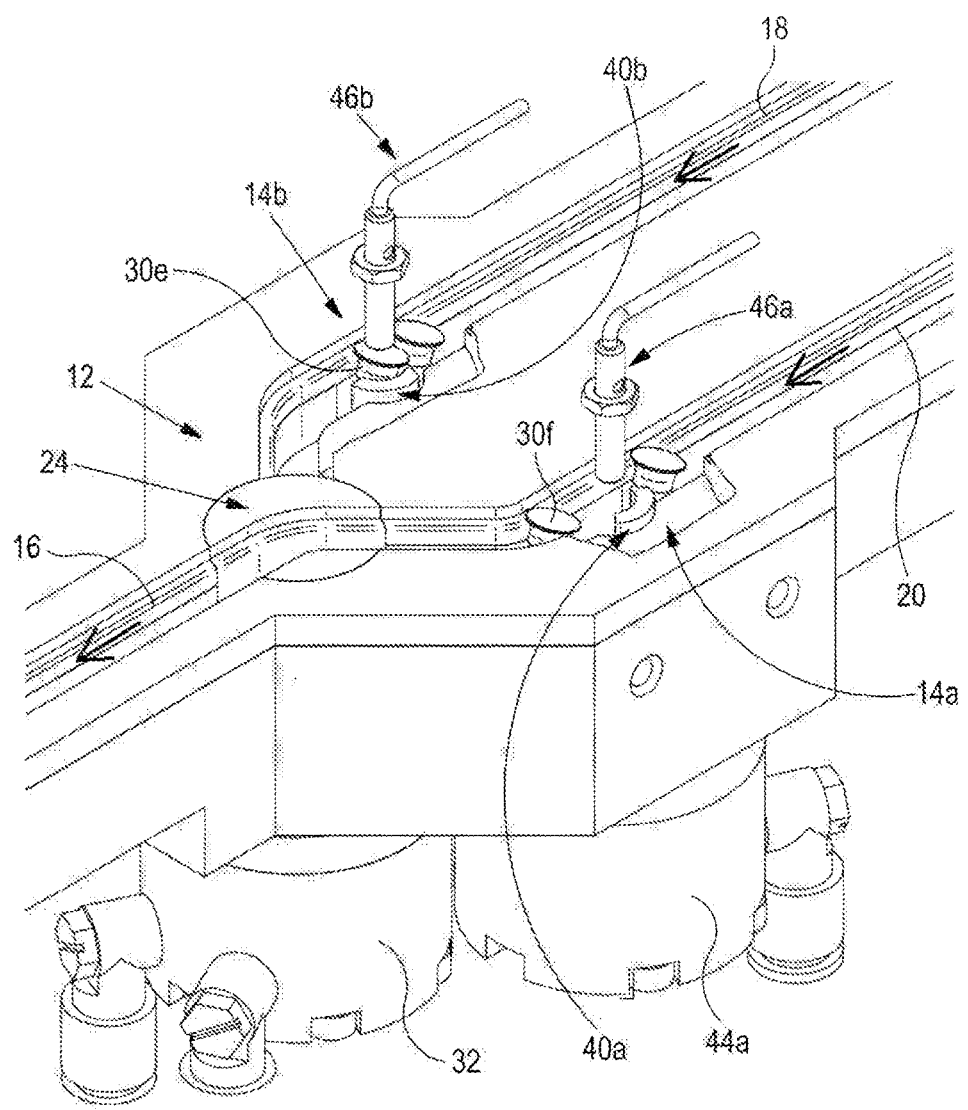
FIGS. 9 and 10 show schematic perspective and plan views of a portion of a rivet handling device comprising a rivet track selection device and two rivet selection devices according to embodiments of the present invention.
Figure 10:
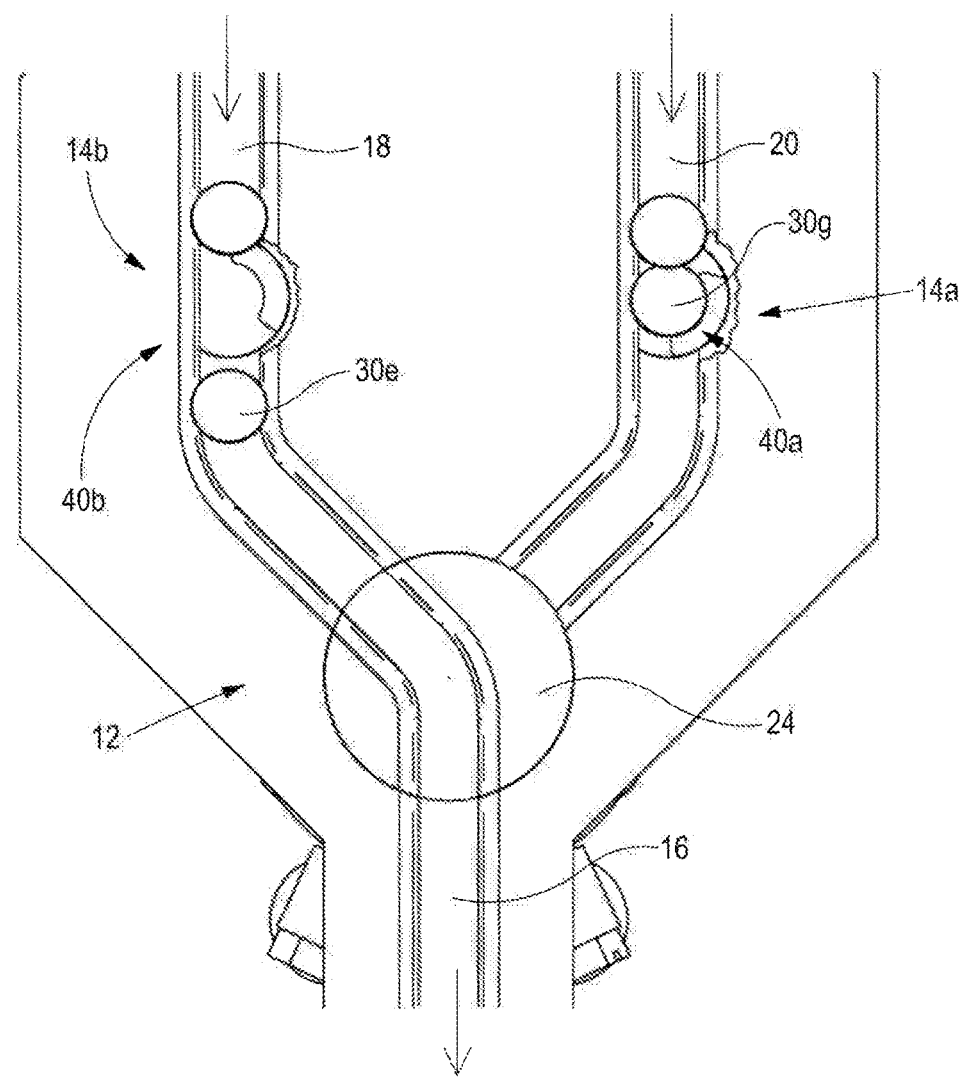
Figure 11:
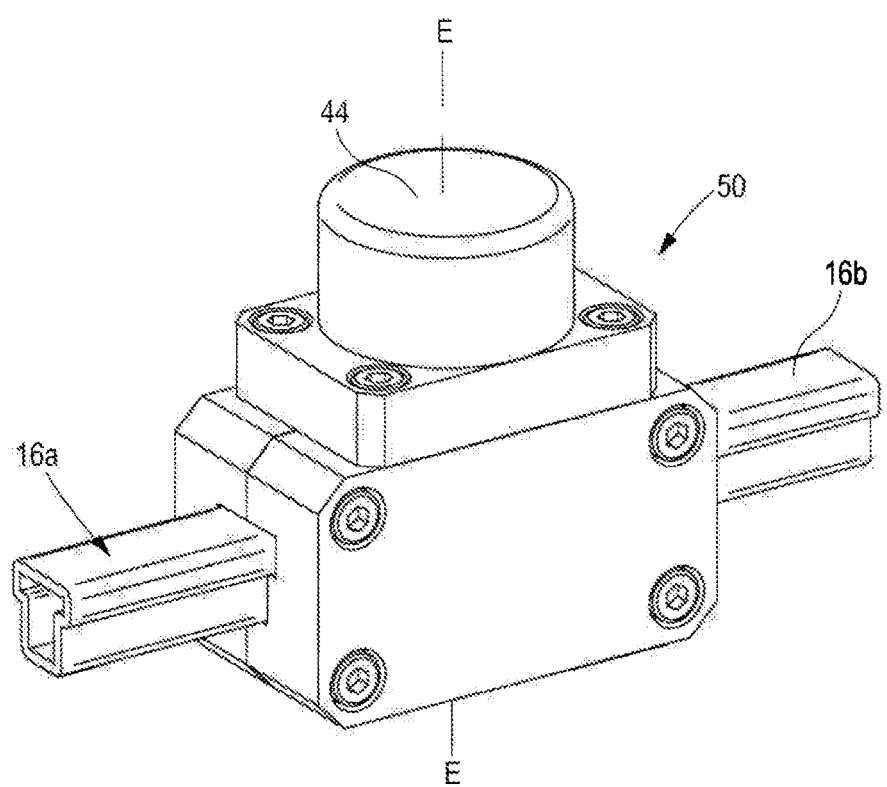
FIGS. 11 to 15 show schematic views of a rivet selection device in accordance with an embodiment of the present invention.

In some applications the second and third rivet conduits 18, 20 may be configured to be supplied with fasteners with first and second upstream fastener sources respectively. Such an embodiment is shown in FIGS. 9 and 10 which are discussed later. In such applications the first fastener conduit 16 may be configured to supply fasteners to a downstream fastener consumer. In this way, the fastener track selection device may be used to choose between fasteners from the first or second upstream fastener source and supply fasteners from the desired upstream fastener source to the downstream fastener consumer. For example, in the case that the fastener track selection device formed part of a rivet setter, the fastener track selection device may be used to ensure that a correct type of rivet is supplied to the rivet setter depending on whether a rivet of the first or second type (located in the first and second fastener sources respectively) is required given the configuration of a working piece that a rivet setter is required to secure.

In another application the second and third fastener conduits 18 and 20 may be configured to supply fasteners to at least one downstream fastener consumer. In some embodiments the second and third conduits may be configured to supply fasteners to two separate rivet setters, or, alternatively, the second and third conduits may supply fasteners to different portions of a single rivet setter. The first fastener conduit 16 may be configured to receive fasteners from an upstream fastener source. It follows that in these applications the fastener track selection device can be used to enable rivets from a single source of fasteners to selectively supply either two different fastener consumers or two different portions of a particular fastener consumer.

In some applications more than one of the rivet track selection devices may be used in series to enable supply of rivets from a larger number of rivet supply locations and/or receipt of rivets by a larger number of rivet consumers.

As previously discussed, the rivet handling device 10 shown in FIGS. 1 to 6 also includes an in-line rivet selection device 14. The selection device 14 includes a rivet conduit 16 having a first rivet conduit portion 16a and a second rivet conduit portion 16b. The selection device 14 further comprises an escapement mechanism 40 located between the first and second rivet conduit portions 16a and 16b.

In the present embodiment the rivet selection device 14 comprises a rotor 42 which rotates about a rotation axis E relative to a stator which, in the present embodiment, is constituted by the main body 22 of the device 10. The rotor 42 of the present embodiment comprises a base 42a from which a pawl 42b extends in a direction generally parallel to the rotation axis E. As can be seen most clearly in FIGS. 2, 5, 6 and 8 the pawl 42b is generally arcuate in cross-section perpendicular to the rotation axis E. In particular, the shape of the pawl 42b is such that it has a centre of curvature which is located on the rotation axis E. The pawl 42b subtends an angle of approximately 120 degrees about the rotation axis E.

As seen best in FIG. 4, the device 14 includes biasing means 41 in the form of compression springs. The biasing means 41 are configured to urge the rotor 42 towards the stator 22 in a direction generally parallel to the rotation axis E. In particular, the biasing means 41 urge the generally radial face 43 of the rotor against the adjacent generally radial face 45 of the stator 22. This creates a seal between the rotor and the stator. As already discussed, such a seal may be useful in applications whereby the fasteners are propelled along the conduits of the supply line using compressed gas, such as compressed air or the like.

Figure 7:
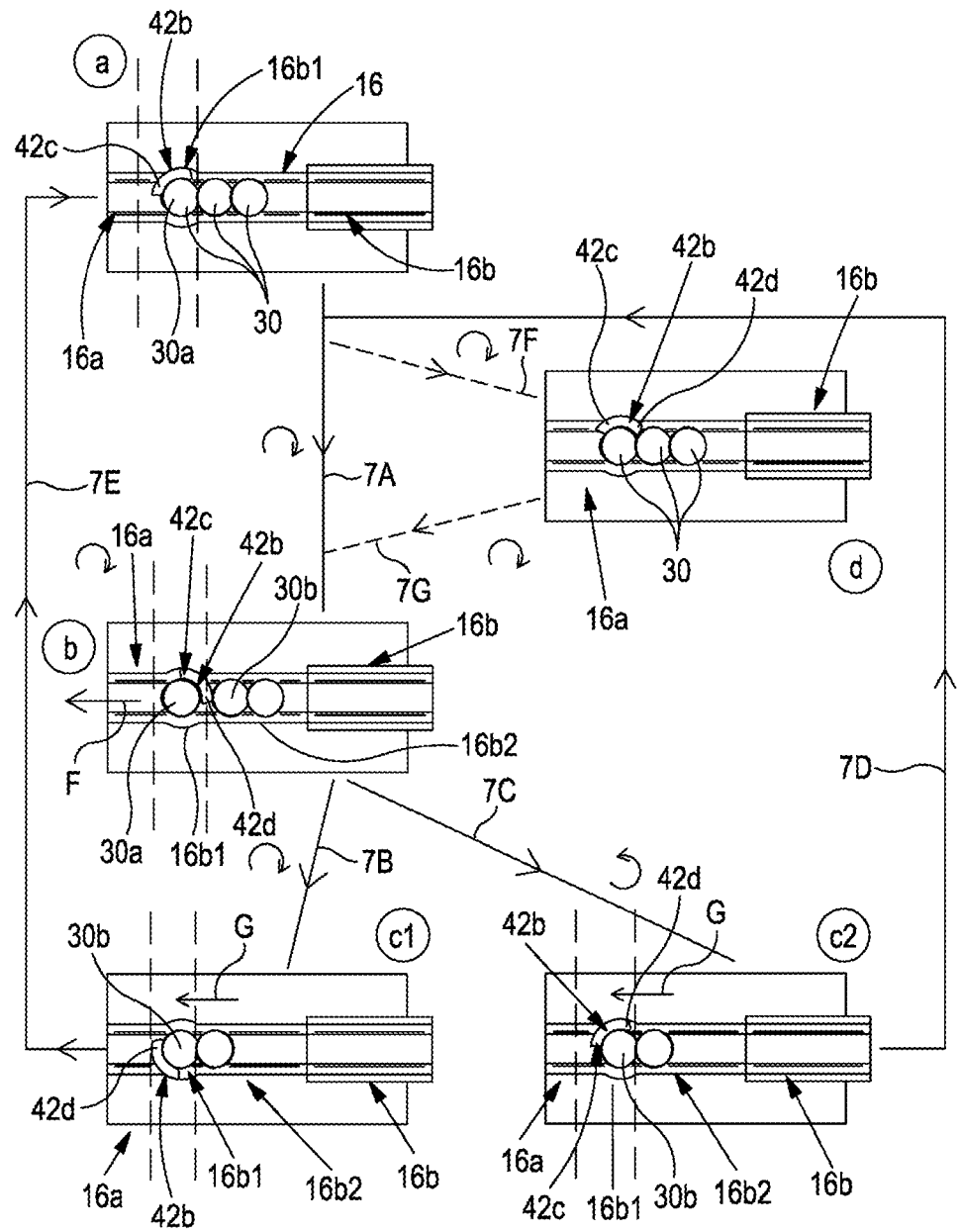
FIG. 7 shows a schematic view of various configurations of an escapement mechanism of a rivet selection device according to an embodiment of the present invention.

FIG. 7 shows a highly schematic view of a portion of the rivet selection device 14 as shown in FIGS. 1 to 6. In particular, FIG. 7 shows the first and second rivet conduit portions 16a and 16b together with the pawl 42b of the escapement mechanism. In addition, FIG. 7 shows several rivets 30 located in the rivet conduit 16.

It will be appreciated that FIG. 7 is a highly schematic representation of interaction between the escapement mechanism and the rivets within the present embodiment of the rivet selection device. In reality the pawl 42b may have a slightly different shape and, not only will the pawl be in contact with the rivet adjacent to it, but, also, adjacent rivets behind the escapement mechanism will contact one another.

FIG. 7 shows five different configurations of the rivet selection device, and, in particular, of the pawl of the escapement mechanism of the rivet selection device. These different configurations are labelled a, b, c1, c2 and d.

FIG. 7 shows a first configuration (denoted by a) in which a first barrier portion 42c of the escapement mechanism is configured to block the passage of a leading rivet 30a from a first section 16b1 of the second rivet conduit portion 16b to the first rivet conduit portion 16a.

Configuration b within FIG. 7 is a second configuration, in which the first barrier portion 42c is configured to permit the passage of the leading rivet 30a from the first section 16b1 of the second rivet conduit portion 16b to the first rivet conduit portion 16a. A second barrier portion 42d of the pawl 42b of the escapement mechanism is configured to block the passage of a trailing rivet 30b from a second section 16b2 of the second rivet conduit portion 16b to the first section 16b1 of the second rivet conduit portion 16b.

The fact that the leading fastener 30a is permitted to pass from the first section of the second rivet conduit portion to the first rivet conduit portion is represented by arrow F. Within FIG. 7, movement of the escapement mechanism from the first configuration a to the second configuration b is noted schematically by arrow 7A. In the present case this involves rotation of the rotor 42, and hence pawl 42b, in a clockwise direction by approximately 90 degrees.

FIG. 7 also shows two alternative possible third configurations c1 and c2 of the escapement member (and hence pawl 42b) in which the second barrier portion 42d is configured to permit the passage of the trailing fastener 30b from the second section 16b2 of the second rivet conduit portion 16b to the first section 16b1 of the second rivet conduit portion 16b. Movement of the trailing fastener 30b from the second section of the second rivet conduit portion to the first section of the second rivet conduit portion is indicated by arrow G.

In addition, in the first possible alternative of the third configuration c1, the second barrier portion 42d of the escapement mechanism is also configured to block the passage of the trailing fastener 30b from the first section 16b1 of the second rivet conduit portion 16b to the first rivet conduit portion 16a. The movement of the escapement mechanism between the second configuration b and the first alternative of the third configuration c1 is represented by arrow 7B. In the present embodiment this is a rotation of the rotor 42 of the escapement (and hence the pawl 42b) in a clockwise direction by about 180 degrees.

FIG. 7 also shows a second possible alternative of a third configuration c2. In this alternative of the third configuration, just as with the first alternative of the third configuration c1, the second barrier portion 42d of the escapement mechanism is configured to permit the passage of the trailing fastener 30b from the second section of the second rivet conduit portion 16d2 to the first section of the second fastener conduit portion 16d1. However, in contrast to the first alternative of the third configuration c1, the second alternative of the third configuration c2 is such that the first barrier portion 42c is configured to block the passage of the trailing fastener 30b from the first section 16b1 of the second rivet conduit portion 16b to the first rivet conduit portion 16a.

Within FIG. 7, movement of the rotor (and hence pawl) of the escapement mechanism from the second configuration b to the second alternative third configuration c2 is denoted schematically by arrow 7C. In the present case this is a rotation of the rotor of the escapement mechanism in an anti-clockwise direction by approximately 90 degrees.

Figure 3:
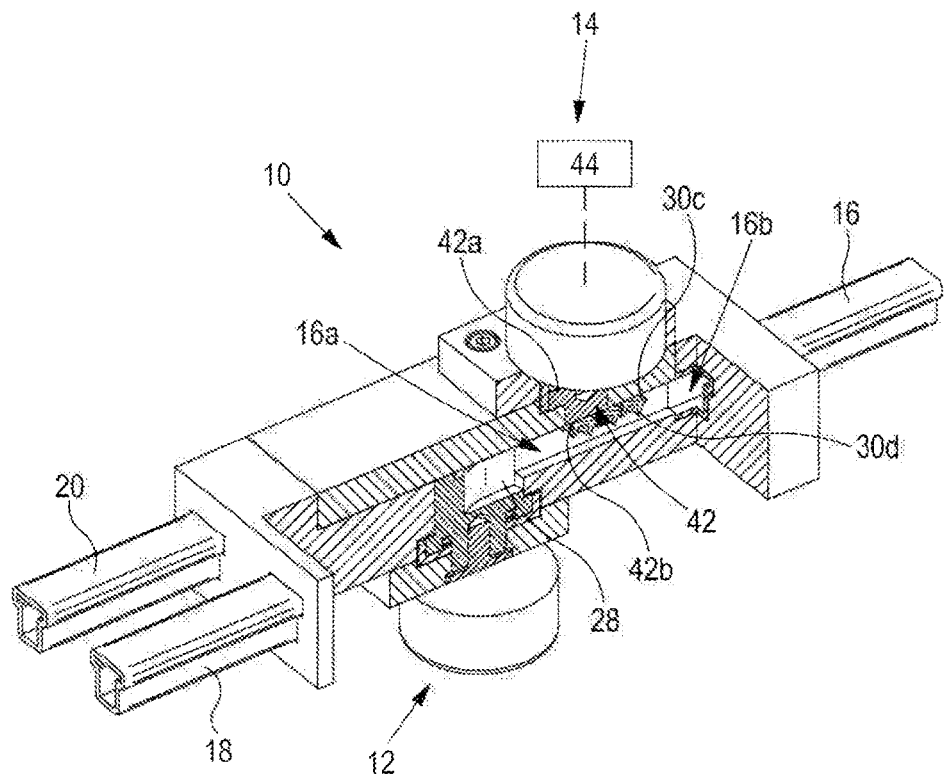

Although the configurations of the escapement mechanism of the rivet selection device are being described in detail in relation to FIG. 7, for completeness, it should be noted that FIGS. 2, 3 and 6 also show the escapement mechanism in the first configuration. FIGS. 4 and 5 show the escapement mechanism in the second configuration.

It will be appreciated that, as shown in FIG. 7, the second alternative of the third configuration c2 is equivalent to the first configuration a. In particular, the location of the rotor (and hence pawl 42b) of the escapement mechanism in the second alternative of the third configuration is the same as that in the first configuration a. The only difference is that, in the first configuration a, the first barrier portion 42c of the escapement mechanism is preventing the leading fastener from passing to the first rivet conduit portion 16a, whereas, in the second alternative of the third configuration c2 the first barrier portion 42c of the escapement mechanism blocks the passage of the trailing rivet 30b to the first rivet conduit portion 16a because (in the second configuration b) the leading rivet 30a has already been released by the escapement mechanism in advance of the second alternative of the third configuration c2.

To the contrary, the position of the rotor (and hence pawl 42b) of the escapement mechanism is different in the first alternative of the third configuration c1 as compared to that of the first configuration a.

Figures 8A, 8B:
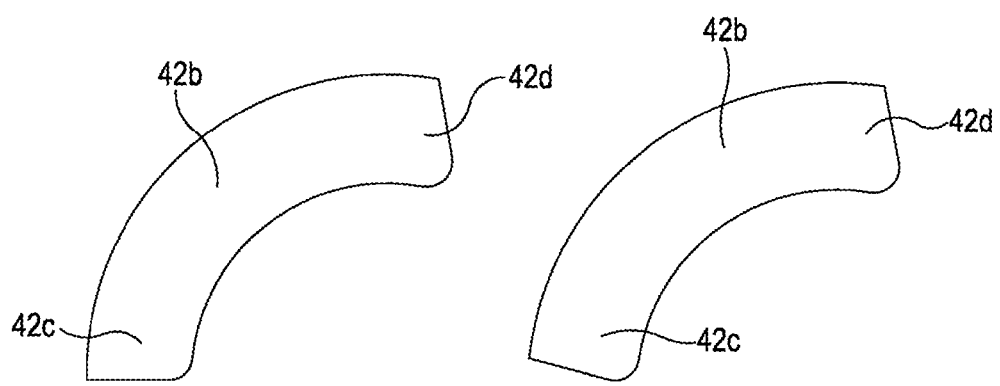
FIGS. 8a and 8b show schematic views of two pawl-type escapement mechanisms of rivet selection devices according to embodiments of the present invention.

As can be seen most clearly in FIGS. 8a and 8b, in the presently described embodiment the first end of pawl 42b of the escapement mechanism constitutes the first barrier portion 42c of the escapement mechanism and the second end of the pawl 42b constitutes the second barrier portion 42d of the escapement mechanism. As will be discussed in more detail later within this document, this need not always be the case. The radiused portion at the radially innermost edge of the second end/barrier portion 42d of the pawl is used to separate the rivet heads or stems of two adjacent rivets (the leading rivet and the trailing rivet) as the pawl moves into the second configuration. The pawl shown in FIG. 8a is suitable for use in applications whereby rivets flow to the pawl in a single direction. Whereas, the pawl shown in FIG. 8b is suitable for use in applications whereby rivets flow to the pawl in a both directions. In order to facilitate the change, the first and second ends of the pawl shown in FIG. 8b are symmetrical, whereas those of the pawl shown in FIG. 8a are not.

The use of an escapement mechanism according to the present embodiment enables rivets in a rivet supply line to be metered out individually as and when they are required. This has several benefits including the prevention of potential jamming/blockage of the rivet supply line downstream of the rivet selection device due to the fact that rivets only travel along the supply line downstream of the rivet selection device one at a time. Furthermore, the rivet selection device enables control as to when a particular rivet travels along the rivet supply line downstream of the rivet selection device. As such, it is possible to supply rivets to a rivet consumer downstream of the fastener selection device only at a time when they are required by the rivet consumer. This may prevent an unwanted build-up of rivets at the rivet consumer.

In the configuration a of the escapement mechanism the first barrier portion 42*c* of the escapement mechanism is located at a first position and the second barrier portion 42*d* of the escapement mechanism is located at a second position. Additionally, in the second configuration b of the escapement mechanism the first barrier portion 42*c* is located at a third position, and the second barrier portion 42*d* of the escapement mechanism is located at a fourth position. The rivet selection device is configured such that the first barrier portion 42*c* is actuable from the first position (as in the first configuration a) to the third position (as in the second configuration b) coupled with the second barrier portion 42*d* being actuated from the second position (as in the first configuration a) to the fourth position (as is the case in the second configuration b).

Where it is said that the first barrier portion is actuable coupled with the second barrier portion, what is meant is that the first and second barrier portions are coupled together such that a single actuator can simultaneously move both the first and second barrier portions. This may be advantageous as compared to systems which include separate actuators for moving first and second barrier portions because the need for only a single actuator reduces cost and complexity. Furthermore, because the first and second barrier portions are coupled to one another for movement, it means that the first and second barrier portions undergo movement which is synchronised—unless the coupling between the first and second barrier portions is broken, it is not possible for the movement of the first and second barrier portions to become out of sync. It will be appreciated that out of sync movement of the first and second barrier portions may result in incorrect functioning of the rivet selection device and, in particular, may lead to the escapement mechanism and/or rivets passing through the escapement mechanism becoming jammed.

For completeness, in the first alternative of the third configuration c1, the second barrier portion 42*d* of the escapement mechanism is in a fifth position, and the first barrier portion 42*c* of the escapement mechanism is in a sixth position. The rivet selection device is configured such that the first barrier portion 42*c* is actuable from the third position to the sixth position (e.g. when the escapement mechanism moves from the second configuration b to the first alternative third configuration c1) coupled with the second barrier portion 42*d* being actuated from the fourth position to the fifth position. The benefits of the first and second barrier portions being coupled together so that they can be simultaneously actuated has already been discussed above.

Alternatively, as is the case with the second alternative of the third configuration c2, the first barrier portion 42*c* of the escapement mechanism is in the first position and the second barrier portion 42*d* of the escapement mechanism is in the second position. The rivet selection device is configured such that the first barrier portion 42*c* is actuable from the third position to the first position (e.g. when the escapement mechanism moves from the second configuration b to the second alternative third configuration c2) coupled with the second barrier portion 42*d* being actuated from the fourth position to the second position. Again, the benefits of the first and second barrier portions being coupled so that they are actuated simultaneously has already been discussed above and so will not be repeated here.

As has already been discussed, movement of the escapement mechanism between the first, second and third configurations is achieved by rotation of the rotor 42*a* of the escapement mechanism 42 relative to the stator. Such rotation may be achieved in any appropriate manner. In some embodiments the rivet selection device 14 comprises an actuator 44 configured to rotate the rotor 42 relative to the stator 22 about the axis E in the manner already discussed. The actuator may be a rotary actuator or a linear actuator. That is to say the actuator may output rotary motion as a result of the actuator being driven for rotation, or the actuator may output rotary motion as a result of linear motion input.

Returning now to FIG. 7, the rivet selection device may be configured such that the escapement mechanism oscillates between the second and third configurations. In the most straightforward alternative, the escapement mechanism passes from the second alternative third configuration c2 along schematic lines 7D and 7A to the second configuration b and then back to the second alternative third configuration c2 along the line 7C.

Whereas the escapement mechanism oscillates directly between the second and third configurations b and c2, in other embodiments the escapement member may oscillate between second and third configurations b and c1 in an indirect manner. For example, the escapement mechanism moves from the first alternative third configuration c1 to the second configuration b along line 7E, via the first configuration a and line 7A. The escapement mechanism then moves from the second configuration b to the third configuration via the line 7B etc. It will be noted that movement between the first alternative third configuration c1 and the first configuration a is a rotation of the rotor 42 (and hence pawl 42*b*) in a clockwise direction by about 90 degrees.

Oscillation between the second and third configurations, as discussed above, is beneficial in that it allows an on-going stream of rivets to be metered out by the rivet selection device. The main difference between the said oscillation between the second and third configurations in the case of the first alternative third configuration and in the case of the second alternative third configuration is that, in the case of the first alternative third configuration, the cycle of movement of the rotor involves only movement of the rotor in the clockwise direction. To the contrary, the cycle of configurations which includes the second alternative third configuration c2 involves rotation of the rotor in the clockwise configuration, followed by rotation of the rotor in the anticlockwise direction.

The two alternatives have their relative advantages and disadvantages. For example, a rotor in the case of the second alternative third configuration the rotor travels less angular distance when executing an oscillation (about 180 degrees as compared to about 360 degrees). This means that the cycle of the escapement mechanism may be quicker in the case of the second alternative third configuration c2. Additionally, because the actuator is only having to move a rotor by half the angular distance, it is possible that the actuator will last more cycles, therefore making the escapement mechanism of the rivet selection device more reliable/longer lasting. Alternatively, because an actuator actuating the cycle including the first alternative third configuration c1 only has to rotate in a single direction, this may lead to less wear and tear on the actuator and hence a longer life of the actuator resulting in increased reliability of the rivet selection device.

As can be seen in FIG. 7, the escapement mechanism of the rivet selection device may include a fourth configuration d. The fourth configuration d is optional and may therefore not be present in all embodiments of the invention. In the fourth configuration d, which in the present embodiment is between the first and second configurations a and b, the first barrier portion 42c and second barrier portion 42d are configured to hold the leading fastener 30a within the escapement mechanism such that the leading fastener is not free to exit the escapement mechanism in either travel direction. As can be seen from FIG. 7, the fourth configuration d is accessed from the first configuration a by a clockwise rotation of the rotor 42a (and hence pawl 42b). This is represented schematically by the dashed line 7F. Similarly, the escapement mechanism moves from the fourth configuration d to the second configuration b by a further clockwise rotation of the rotor 42a and hence pawl 42b. This is represented schematically by the dashed line 7G.

The presence of a fourth configuration d of the escapement mechanism may be advantageous in some applications of the rivet selection device. In particular, the presence of a fourth configuration can be used to retain a rivet within the escapement mechanism and/or first section 16b1 of the second portion of the rivet conduit 16b. For example, in some applications, fourth configuration may be used to retain a rivet in the first section of the second conduit portion against the action of gravity or any other force which acts so as to urge the rivet away from this position. Additionally, the fourth configuration d allows the relevant rivet to be held in position whilst the rivet selection device is moved (for example when the rivet selection device is mounted on a robot arm). When the rivet selection device comes to rest the escapement mechanism can then be moved from the fourth configuration d to the second configuration b, when required.

The use of a fourth configuration means that when the leading rivet requires release (for example, to take part in a rivet setting operation) because the escapement mechanism only has to move from the fourth configuration d to the second configuration b, as opposed to from the first configuration a to the second configuration d, the distance the escapement mechanism has to move to release the leading rivet is less, thereby speeding up the process (e.g. reducing the cycle time between rivet setting operations).

As is well known in the art, rivets, and in particular self-piercing rivets, include a head portion 30c from which a stem portion 30d depends. As best shown in FIG. 3, in the present embodiment the first and second barrier portions 42c, 42d of the pawl 42b are configured to contact a head portion of the rivet as they pass through the escapement mechanism.

In other embodiments, in addition, or alternatively, the first and second barrier portions may be configured to contact a stem portion of the rivets.

Turning now to FIG. 9, which shows a rivet track selection device 12 in which the second and third rivet conduits 18, 20 are configured to be supplied with fasteners from first and second upstream fastener sources, and the first fastener conduit 16 is configured to supply rivets to a downstream rivet consumer, it can be seen that each of the second and third rivet conduits 18, 20 include their own respective rivet selection device 14b, 14a of the same type discussed in relation to FIGS. 1 to 8, including respective escapement mechanisms 40b, 40a and actuators—not shown in relation to rivet selection device 14b, and 44a in relation to rivet selection device 14a.

In addition, each rivet selection device 14a, 14b includes a rivet location sensor 46a, 46b. The rivet location sensors 46a and 46b detect the presence or otherwise of a rivet at the respective escapement mechanism 40a, 40b, and, in particular, at the first section of the second portion of the respective conduit 20, 18.

In the present embodiment only one rivet at a time is sent to the track selection device 12 from the escapement mechanisms 40a, 40b of the third and second conduits 20, 18. In this way, the rivet track selection device 12 (and in particular the actuator 32 thereof) is controlled in combination with the actuators of each of the rivet selection devices 14a, 14b to ensure that either in advance of a rivet being released from a particular escapement mechanism 40a, 40b of a particular conduit 20, 18 (or, alternatively, as a result of a rivet being released from the escapement mechanism 40a, 40b of one of the conduits 20, 18) the rotor 24 of the rivet track selection device 12 is orientated by the actuator 32 so that the connection space adjoins both the first conduit 16 and the respective second or third conduit from which the rivet is either about to be released from or has been released from by the respective escapement mechanism 40a, 40b.

In the embodiment shown in FIG. 9, the escapement mechanism 40b of the rivet selection device 14b of the second conduit 18 is in the first configuration, whereby the rivet 30e is prevented from moving past the escapement mechanism. To the contrary, the escapement mechanism 40a of the rivet selection device 14a of the third conduit 20 is in the second configuration, whereby rivet 30f has been released by the escapement mechanism 40a. In this situation the rivet position sensor 46a detects that rivet 30f is no longer located at the escapement mechanism 40a and this causes a controller to, based on the sensor signal produced by the sensor 46a, control the actuator 32 of the rivet track selection device 12 to arrange the rotor 24 so that the connection space adjoins the first and third conduit 16, 20 so as to enable the rivet 30f to pass from the third conduit 20 to the first conduit 16.

FIG. 10 shows a separate configuration of the devices shown in FIG. 9, whereby the escapement mechanism 40a of the fastener selection device 14a of the third conduit 20 is in the first configuration, such that the escapement mechanism blocks the passage of rivet 30g past the escapement mechanism; and where the escapement mechanism 40b of the rivet selection device 14b of the second conduit 18 is in the second configuration whereby rivet 30e has been permitted to pass the escapement mechanism 40b. The rivet position sensor 46b detects that the rivet 30e has left the escapement mechanism 40b and, based upon the sensor signal of the sensor 46b indicating that the rivet 30e has left the escapement mechanism 40b, causes the actuator 32 of the rivet track selection device 12 to ensure that the connection space of the rotor 24 is positioned so that the connection space adjoins the first and second rivet conduits 16, 18, so that the fastener 30e released by the escapement mechanism 40b can pass from the second conduit 18 to the first conduit 16.

The previously discussed rivet selection device was one in which movement between the first, second and third (and, optionally fourth) configurations of the escapement mechanism required rotation of a rotor comprising a base from which a pawl extends. A first end of the pawl constituted the first barrier portion and a second end of the pawl constituted a second barrier portion. In other embodiments, such as those shown in FIGS. 11 to 15, the escapement mechanism may still move between different configurations by rotation, but the first and second barrier portions may be constituted by something other than a pawl. FIGS. 11 to 15 show a separate embodiment of rivet selection device 50. The rivet selection device 50 works in exactly the same manner as the earlier discussed rivet selection device 14. Consequently, only the differences between the rivet selection device 14 and rivet selection device 50 will be discussed here.

The rotor 42 of this embodiment comprises a base 42e from which first and second pins 42f, 42g extend in a direction generally parallel to the rotation axis E.

In this embodiment the first barrier portion of the escapement mechanism comprises the first pin 42f and the second barrier portion of the escapement mechanism comprises the second pin 42g. As with the previously discussed embodiment of fastener selection device, the pins 42f and 42g protrude into the conduit 16 so as to interact with the rivets passing through the conduit and thereby either block their path or allow them to pass.

In the present embodiment the angle about the axis E subtended between the centre of the first pin 42f and the centre of the second pin 42g is about 90 degrees.

Although the pins described in relation to the present embodiment have a generally circular cross-section and are spaced by approximately 90 degrees, it will be appreciated that in other embodiments the pins may have any appropriate cross-sectional shape and may be spaced by any appropriate angular distance.

Figure 12:
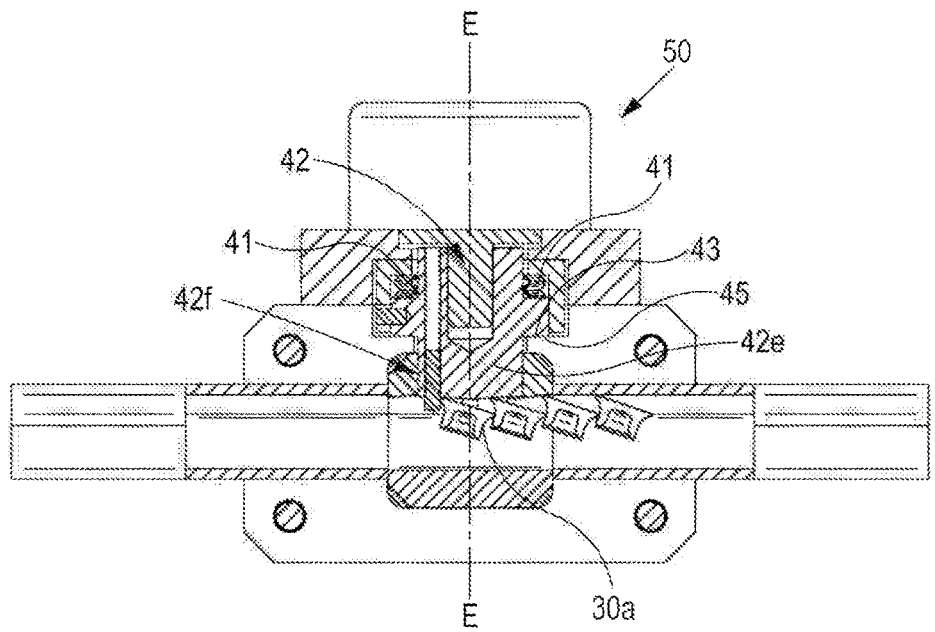
Figure 13:
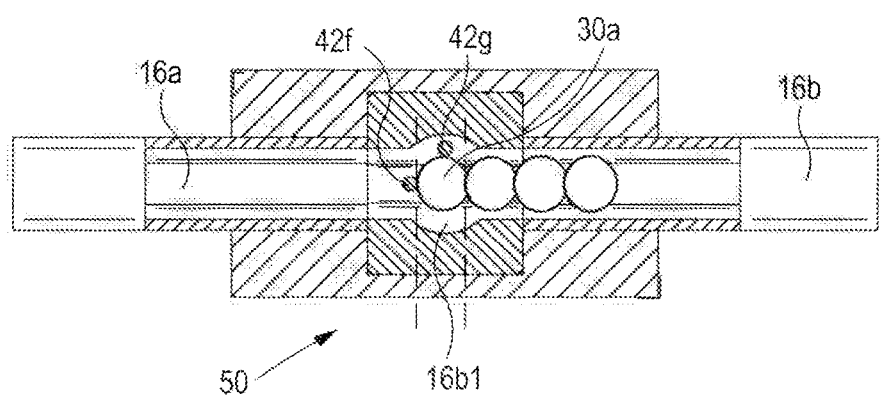

As will be apparent to the reader, the rivet selection device 50 as shown in FIGS. 12 and 13 has an escapement mechanism (and hence rotor 42) which is in the first configuration in which the first barrier portion (including pin 42f) is configured to block the passage of the leading rivet 30a from a first section 16b1 of the second fastener conduit portion 16b to the first fastener conduit portion 16a.

Figure 14:
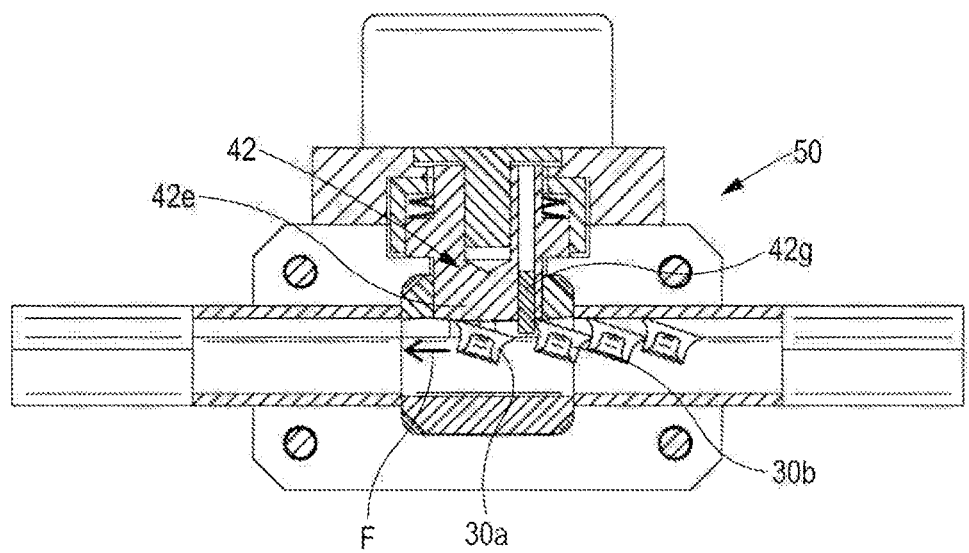
Figure 15:
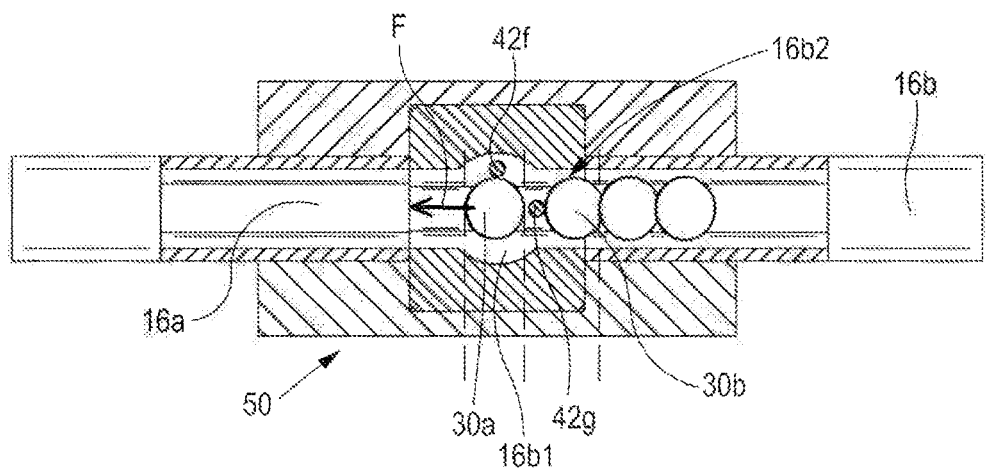

Furthermore, the fastener selection device 50 as shown in FIGS. 14 and 15 has an escapement mechanism (and hence rotor) which is in the second configuration whereby the first barrier portion (including pin 42f) is configured to permit the passage of the leading faster 30a from the first section 16b1 of the second rivet conduit portion 16d to the first fastener conduit portion 16a (said passage being indicated by arrow F). In addition the second portion (including pin 42g) is configured to block the passage of the trailing rivet 30b from a second section 16b2 of the second rivet conduit portion 16b to the first section 16b1 of the second fastener portion 16b.

All other aspects of the functioning of the fastener selection device 50 are entirely equivalent to the functioning of fastener selection device 14. Therefore, for the sake of brevity, further discussion of the functioning of rivet selection device 50 is omitted.

Thus far the described rivet selection devices have been described in isolation from their location within a rivet setter. This is because they may be located at any appropriate location within a rivet setter which requires metered supply of rivets.

In addition, the described rivet selection devices utilise rotary motion of the rotor of the escapement mechanism to move between first, second and third configurations. To the contrary, the embodiment of rivet selection device shown in FIGS. 16 to 21 has an escapement mechanism that translates between the first and second configurations, and between the second and third configurations. Said translation is generally linear, however, this need not always be the case. This is discussed in more detail below.

FIGS. 16 to 21 show a rivet selection device 60 located adjacent a nose portion 62 of a rivet setting device 64. A conduit 66 is configured to supply rivets 68 to the nose portion 62 via the rivet selection device 60. As such, the rivet selection device 60 can meter out rivets to the nose portion of the rivet setting device 64 when required. In the present embodiment the rivets 68 are driven along the conduit 66 towards the nose portion 62 by compressed air.

The rivet selection device 60 comprises an escapement mechanism 70 having a barrier assembly 71 comprising a primary barrier 72 and two secondary barrier members 74a, 74b. The first barrier portion of the rivet selection device comprises the primary barrier 72, and the second barrier portion of the rivet selection device comprises the secondary barrier members 74a, 74b.

Figure 16:
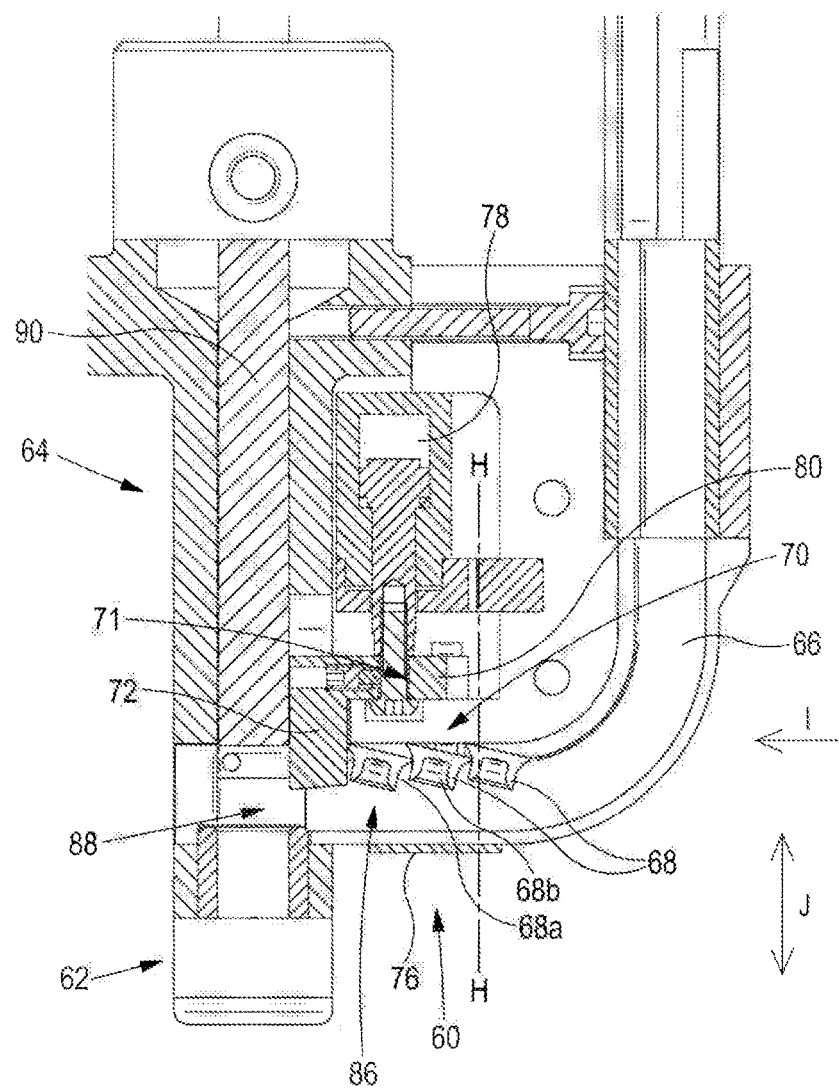
FIGS. 16 to 21 show schematic views of a portion of a rivet setting device including a rivet selection device in accordance with an embodiment of the present invention.
Figure 17:
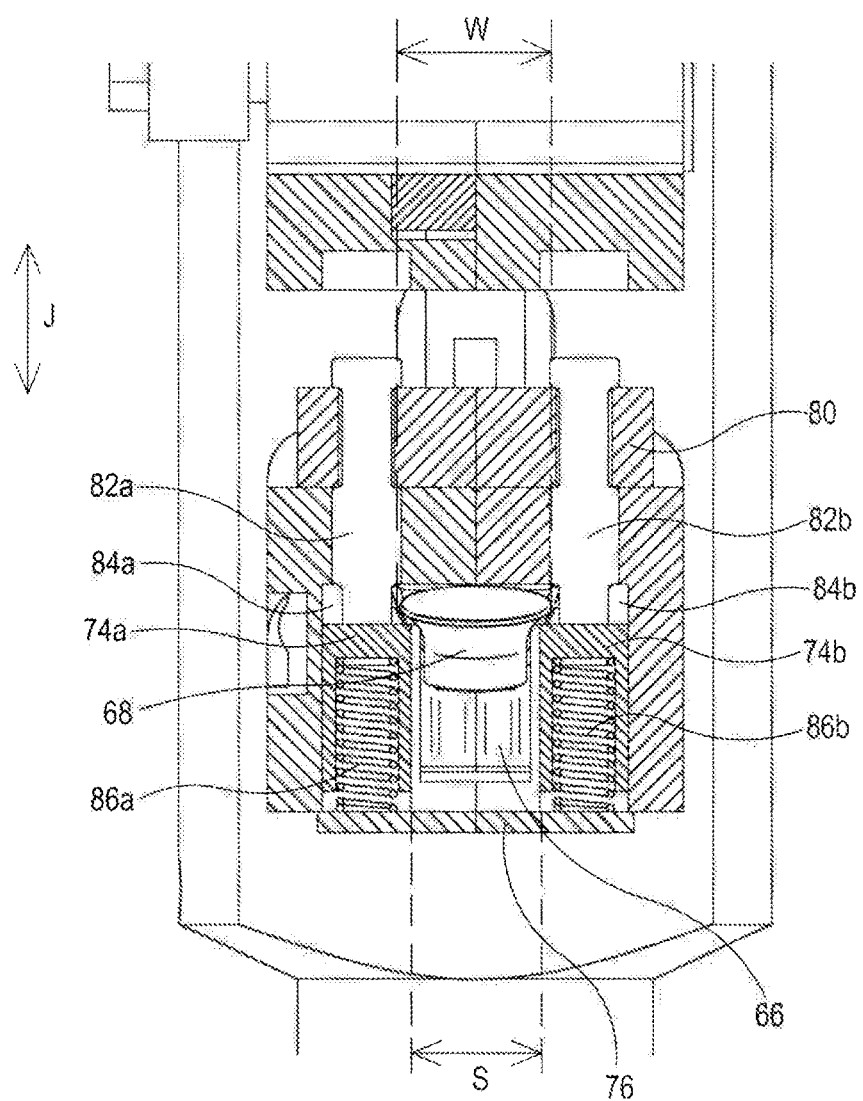
Figure 18:
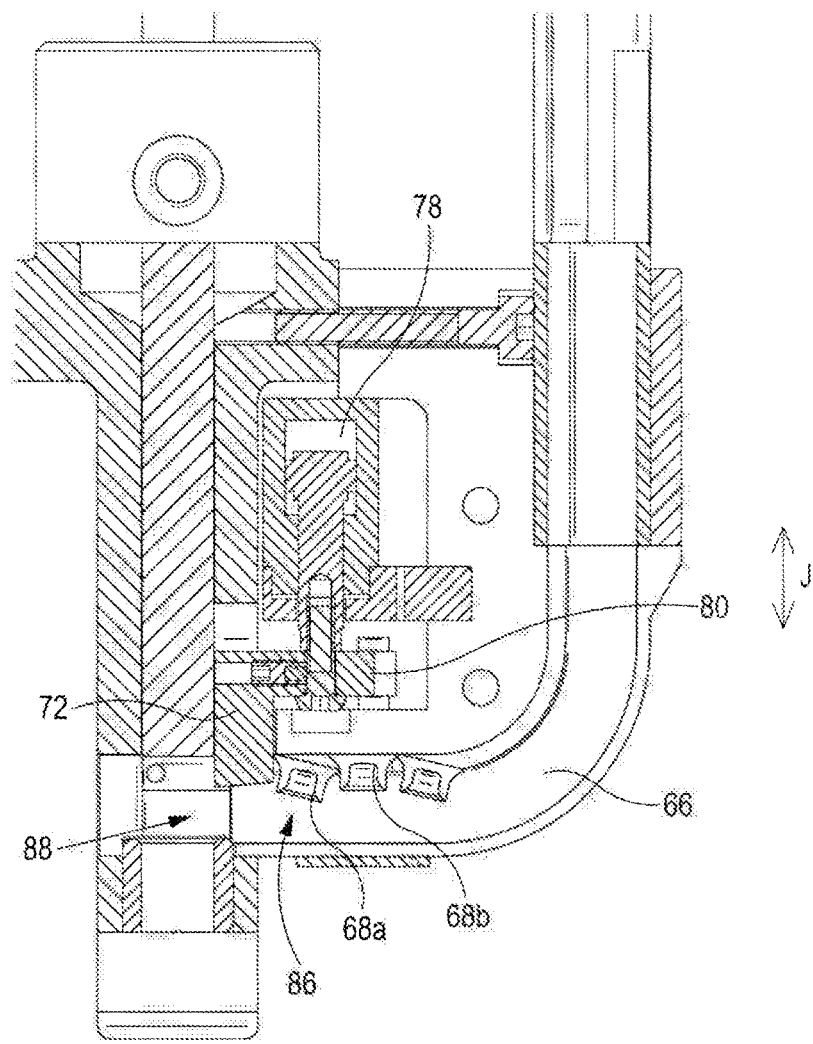
Figure 19:
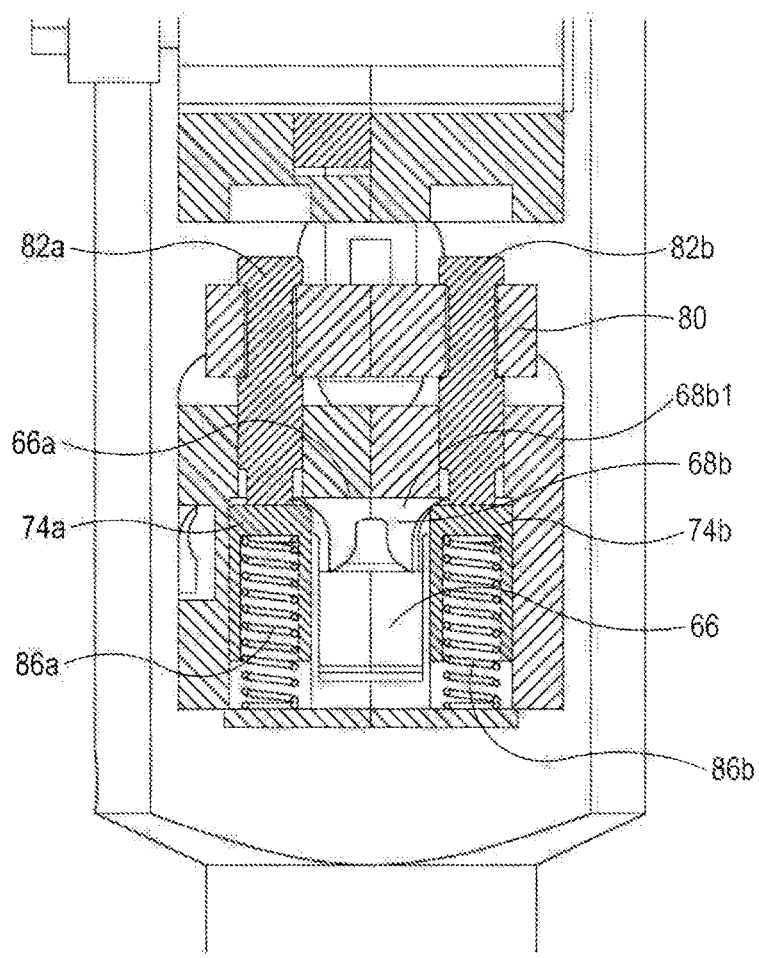
Figure 20:
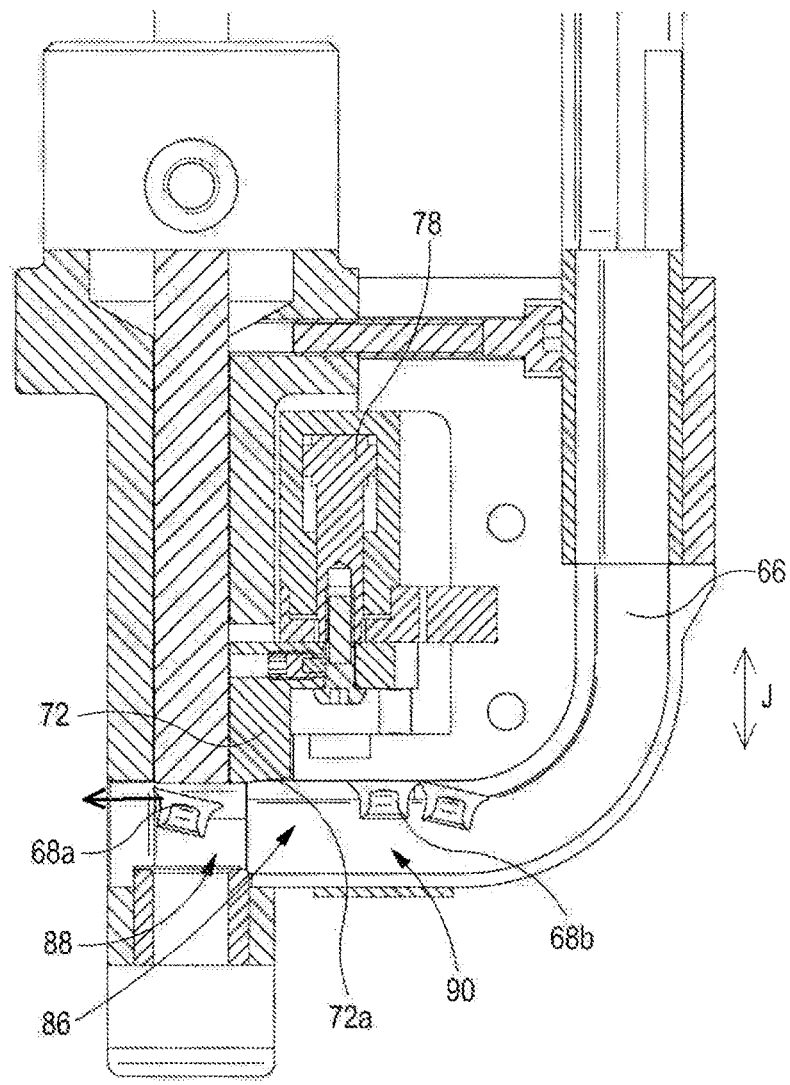
Figure 21:
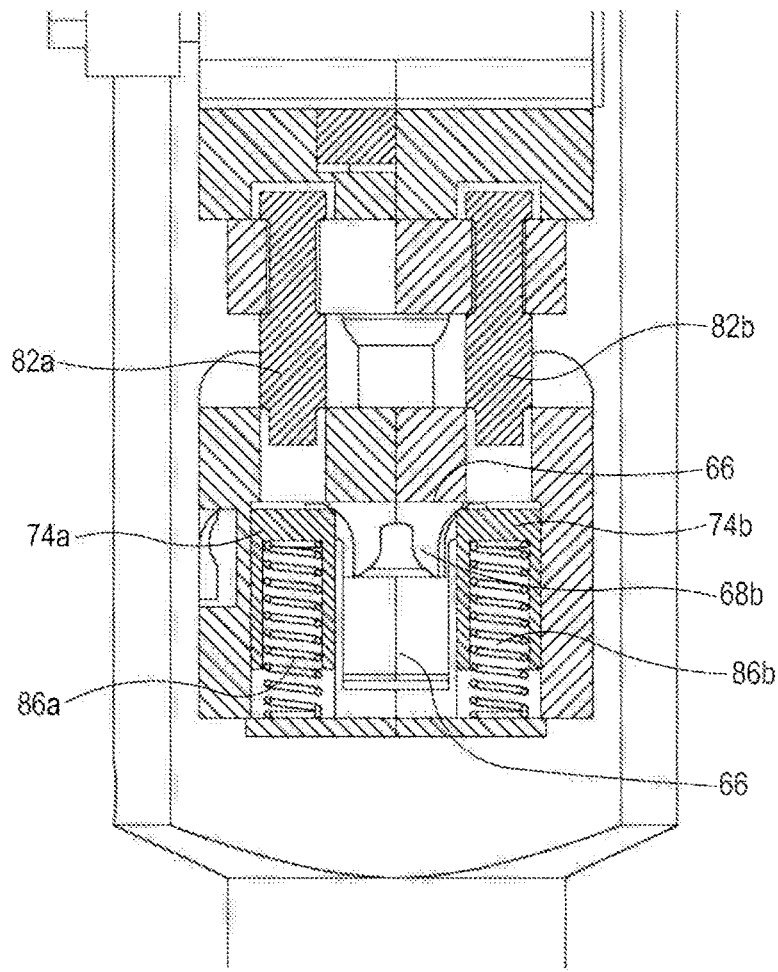

Before going any further it is worth explaining how the side-elevation cross-sections shown in FIGS. 16, 18 and 20 relate to the end cross-sections of FIGS. 17, 19 and 21. The plane of the end cross-sections of FIGS. 17, 19 and 21 is perpendicular to that of the side elevation cross-sections of FIGS. 16, 18 and 20. In particular the planes of the end cross-sections lie along line H-H as shown in FIG. 16. Finally, the end cross-sections of FIGS. 17, 19 and 21 are viewed in the direction of arrow I shown in FIG. 16. Not much of the detail shown in the end cross-sections is visible in the side elevation cross-sections. That said, to aid in consolidating the two views, base plate 76 is visible in both.

As can be seen most clearly in the end cross-sections of FIGS. 17, 19 and 21, the secondary barrier members 74a and 74b are located either side of the fastener conduit, which, in this case, is a T-shaped rivet conduit 66. When it is said that the secondary barrier members 74a and 74b are located either side of the rivet conduit 66, this means that they are spaced apart in a direction which is perpendicular to both the direction of travel of rivets within the conduit 66 and to the height (or longitudinal axis) of the rivets conveyed by the conduit 66.

As can be seen most clearly in FIG. 17, the secondary barrier members 74a, 74b are spaced by a distance S which is less than a maximum width W of a rivet 68 carried by the rivet conduit 66. In the present embodiment the maximum width W of the rivet 68 is the maximum diameter of the head portion of the rivet 68. This is important for the operation of the escapement mechanism 70 of the present embodiment as discussed below. In addition, the secondary barrier members 74a, 74b are spaced by a distance which is greater than a minimum diameter of the rivets. This enables secondary barrier members 74a, 74b to sit outboard of the lower (narrower) portion of the T-shaped rivet conduit.

A pneumatic actuator 78 (which in other embodiments may be any other appropriate type of actuator) drives the barrier assembly 71 in a linear direction J. The barrier assembly comprises a base 80 to which the actuator 78 and primary barrier 72 are connected. The base 80 is also connected to a pair of containment pins 82a, 82b. It follows that as the actuator 78 translates the base 80, the attached primary barrier 72 and containment pins 82a, 82b move with it.

The secondary barrier members 74a and 74b sit in respective channels 84a and 84b, which each extend in the direction J and sit outboard of the narrow portion of the T-shaped conduit. A resilient biasing member 86a, 86b in the form of a spring sits behind each secondary barrier member 74a, 74b so as to bias the secondary barrier members in the upwards direction as seen in FIG. 17. The containment pins 82a, 82b each rest on top of a respective secondary barrier member 74a, 74b. The position of the containment pins 82a, 82*b* act as a stop which limits the upward movement of the secondary barrier members 74*a* and 74*b* under the influence of the resilient biasing members. It follows that as the containment pins 82*a*, 82*b* move up under the influence of the actuator, the resilient biasing members will urge the secondary barrier members upwards. Conversely, as the containment pins 82*a*, 82*b* move down under the influence of the actuator, the resilient biasing members will be compressed and the containment pins will move the secondary barrier members downwards.

FIGS. 16 and 17 show the escapement mechanism in a first configuration. In the first configuration of the escapement mechanism the first barrier portion of the escapement mechanism, which includes the primary barrier 72, is configured to block the passage of a leading fastener 68*a* from a first section 86 of a second rivet conduit portion to a first fastener conduit portion 88. In the present embodiment the second fastener conduit portion includes the conduit 66 and the first section of the second fastener conduit portion may be referred to as a fastener transfer area 86. The first fastener conduit portion may be referred to as a standby position 88. The standby position 88 is a position at which a rivet sits before it is struck by a punch 90 of the rivet setting machine.

In the first configuration of the escapement mechanism, as can be seen best in FIG. 17, the containment pins 82*a* and 82*b* compress the springs 86*a*, 86*b* and thereby hold the secondary barrier members 74*a*, 74*b* out of the conduit 66 so that rivets located in the conduit 66 are able to pass the secondary barrier members 74*a*, 74*b* unhindered.

FIGS. 18 and 19 show the escapement mechanism of the rivet selection device in the fourth configuration. In this configuration the actuator 78 has been actuated so as to move upwards in the direction J. Movement of the actuator 78 upwards in the direction J also moves the base 80 and consequently the primary barrier 72 and containment pins 82*a*, 82*b* upwards. Despite the fact that the primary barrier 72 is moved upwards, it still protrudes into the conduit 66 to the extent that it can continue to block the passage of the leading rivet 68*a* from the rivet transfer area 86 to the standby position 88. As the containment pins 82*a*, 82*b* move upwards, the springs 86*a*, 86*b* urge the respective barrier members 74*a* and 74*b* upwards so that they follow the containment pins 82*a*, 82*b*. As the barrier members 74*a* and 74*b* move upwards they protrude into the conduit 66 so as to contact a head portion 68*b*1 of the trailing rivet 68*b*. The springs 68*a*, 68*b* act so as to urge the secondary barrier members 74*a*, 74*b* upwards to the extent that the head 68*b*1 of the trailing rivet 68*b* is trapped between the secondary barrier members 74*a*, 74*b* and an upper wall 66*a* of the conduit 66. Due to the fact that the trailing fastener 68*b* is trapped by the secondary barrier members 74*a*, 74*b*, the trailing rivet is held within the escapement mechanism such that the trailing rivet 68*b* is not free to exit the escapement mechanism.

FIGS. 20 and 21 show the escapement mechanism of the rivet selection device in a second configuration. In the second configuration of the escapement mechanism the actuator has moved lineally upwards in the direction J relative to the first configuration as shown in FIGS. 16 and 17 (and relative to the fourth configuration as shown in FIGS. 18 and 19). The actuator is now at an upper limit of its movement. Movement of the actuator upwards results in movement of the base 80 and also the attached primary barrier 72 and containment pins 82*a*, 82*b* upward. The primary barrier 72 is moved upwards to the extent that it no longer blocks the passage of the leading fastener 68*a* from the fastener transfer area 68*a* to the standby position 88. In particular, the primary barrier 72 has been retracted from the conduit 66. The leading rivet 68*a* therefore moves from the rivet transfer area 86 to the standby position 88.

In addition, it will be noted that the primary barrier 72 has a tapered end face 72*a*. This may not be present in all embodiments of the present invention. The tapered end face 72*a* assists the leading rivet 68*a* in moving over the end face 72*a* of the primary barrier 72 as the primary barrier 72 is retracted out of the conduit 66.

Turning now to FIG. 21, it can be seen that the containment pins 82*a* and 82*b* have moved upwards relative to their position in the first configuration of the escapement mechanism (and in fact, also in relation to their position in the fourth configuration). As already discussed, the upward movement of the containment pins 82*a*, 82*b*, enables the secondary barrier members 74*a*, 74*b* to move upwards under the action of the springs 86*a*, 86*b* in the same manner as discussed in relation to the fourth configuration. The springs 86*a*, 86*b* urge the secondary barrier members 74*a*, 74*b* so that they extend into the rivet conduit 66 (and, in particular, into the wider portion of the T-shaped conduit). The secondary barrier members 74*a*, 74*b* extend into the conduit 66 so as to contact trailing rivet 68*b* (and in particular the head portion 68*b*1 of the trailing rivet 68*b*) and thereby trap (or grip) the rivet 68*b* (and in particular the head of the rivet) between the secondary barrier members 74*a*, 74*b* and the upper wall 66*a* of the conduit 66. In this way the secondary barrier members 74*a*, 74*b* block the passage of the trailing fastener 68*b* from a second section 90 of the fastener conduit portion 66 to the first section 86 of the second fastener conduit portion 66. In other words, the secondary barrier members 74*a*, 74*b* block the passage of the trailing rivet 68*b* from the rivet queuing area 90 to the rivet transfer area 86.

Other than the fact that the above described embodiment has an escapement mechanism which operates as a result of linear movement of a portion of the escapement mechanism, the methods and principles applied in relation to the embodiments of the invention which include a rotary escapement mechanism are entirely equivalent. As such, for the sake of brevity, further discussion relating to the operation of the present embodiment is omitted. However, it is worth noting that in each case (linear movement of a portion of the escapement mechanism, and rotary movement of a portion of the escapement mechanism) only a single actuator is required to operate the escapement mechanism.

In the present embodiment the secondary barrier members are biased by the resilient biasing means such that movement of the primary barrier in a direction from the first configuration (in which the primary barrier is positioned in the conduit to block passage of a rivet) to the second configuration (in which the primary barrier no longer blocks the passage of said rivet) causes the secondary barrier members to move from the first configuration (in which they are located so that rivets located in the conduit 66 are able to pass the secondary barrier members 74*a*, 74*b*) to the second configuration (in which they are located so that rivets located in the conduit 66 are blocked by the secondary barrier members 74*a*, 74*b*). This may be the case with any embodiment which includes a primary barrier and secondary barrier members. Alternatively, the primary barrier member may be biased by a resilient biasing means such that movement of the secondary barrier members in a direction from the first configuration (in which they do not block passage of a rivet) to the second configuration (in which they block the passage of said rivet) causes the primary barrier to move from the first configuration (in which the primary barrier is located so that a rivet located in the conduit is blocked from passing the primary barrier) to the second configuration (in which the primary barrier is located so that said rivet located in the conduit is no longer blocked by the primary barrier).

It will be appreciated that in the present embodiment the first and third configurations of the escapement mechanism as defined are the same.

Figure 22:
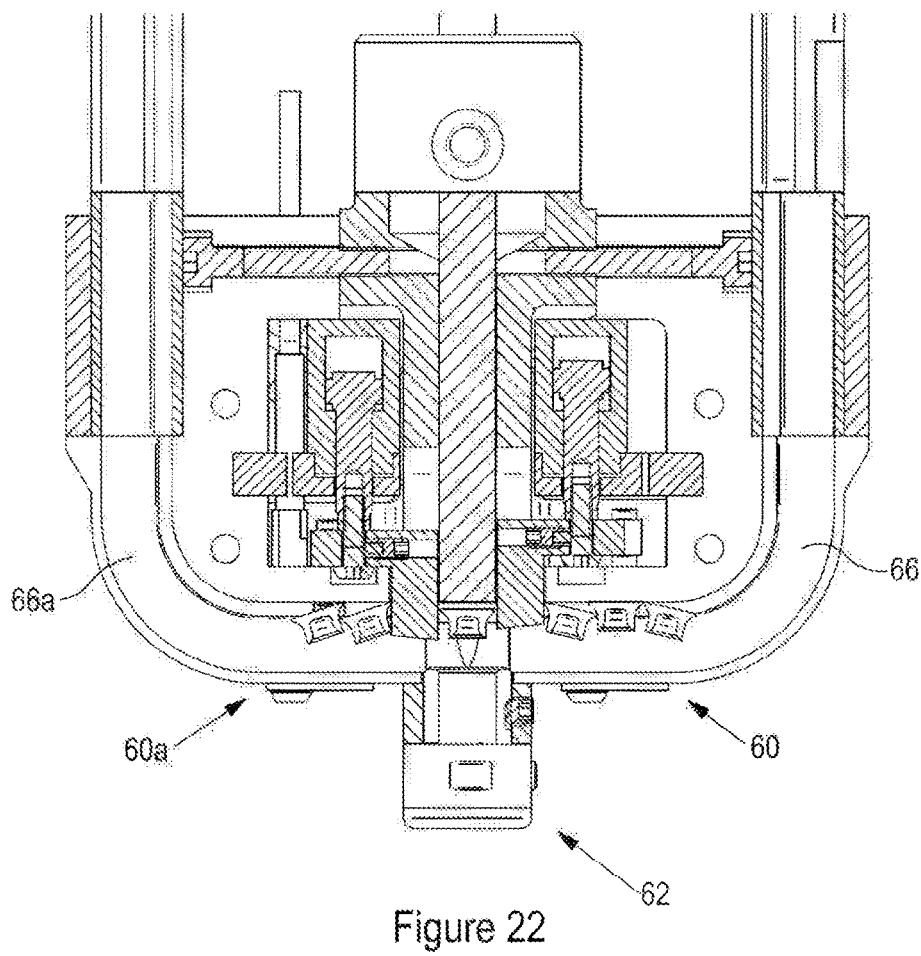
FIG. 22 shows a schematic view of a portion of a rivet setting device including two rivet selection devices in accordance with an embodiment of the present invention.

FIG. 22 shows an alternative fastener setting machine including a plurality of fastener selection devices according to the present invention. In particular, the rivet setting machine shown in FIG. 22 includes a similar rivet selection device 60 and nose 62 as shown in FIGS. 16 to 21. In addition, the rivet setting machine shown in FIG. 22 further comprises a second rivet selection device 60a which selectively feeds rivets from a second rivet conduit 66a to the nose 62. The rivet selection devices 60 and 60a are substantially identical, albeit that they are mirror images of one another.

In use, the rivets provided in the conduit 66 may be identical or different from the rivets supplied in rivet conduit 66a. In the case where the rivets in each of the conduits 66 and 66a are different, the actuation of the rivet selection devices 60, 60a can be controlled so as to ensure that the correct type of rivet (selected from either those in the rivet conduit 60 or rivet conduit 60a) is supplied to the nose of the rivet setting device when required. In embodiments where the rivets metered out by each of the rivet selection devices 60, 60a are the same, the actuation of the fastener selection devices 60, 60a may be operated in anti-phase so as to increase the maximum speed at which rivets can be supplied to the nose and hence increase the maximum speed at which riveting operations can be carried out.

FIGS. 23 to 28 show a further embodiment of rivet selection device in accordance with the present invention. This embodiment is another embodiment in which linear translation of a portion of the escapement mechanism causes the escapement mechanism to change configuration in the manner required by the invention.

Figure 23:
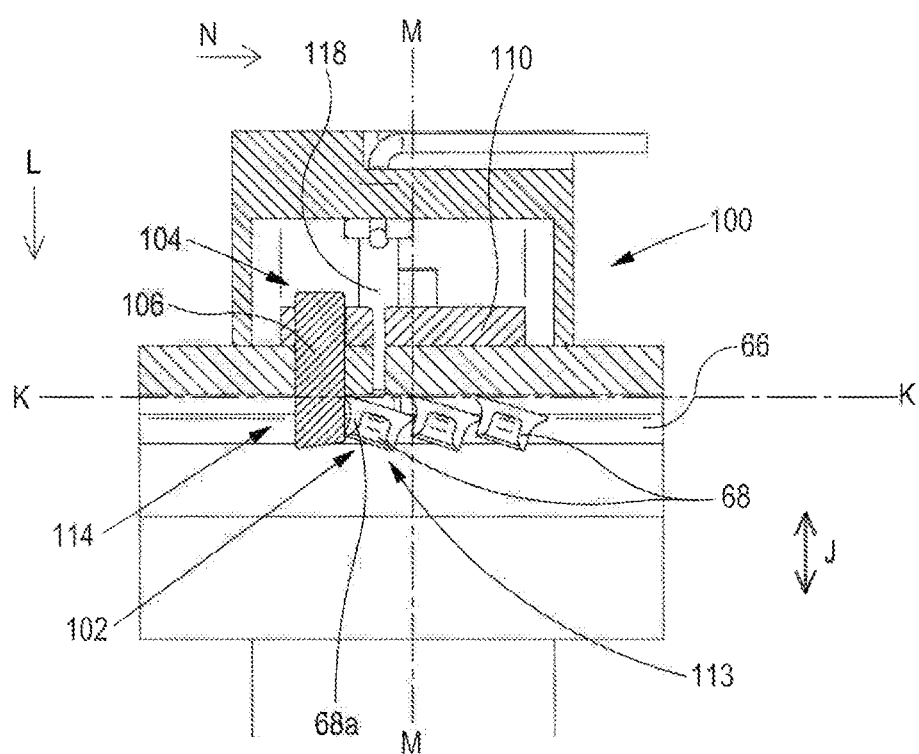
FIGS. 23 to 29 show schematic views of portions of a rivet selection device in accordance with an embodiment of the present invention.
Figure 24:
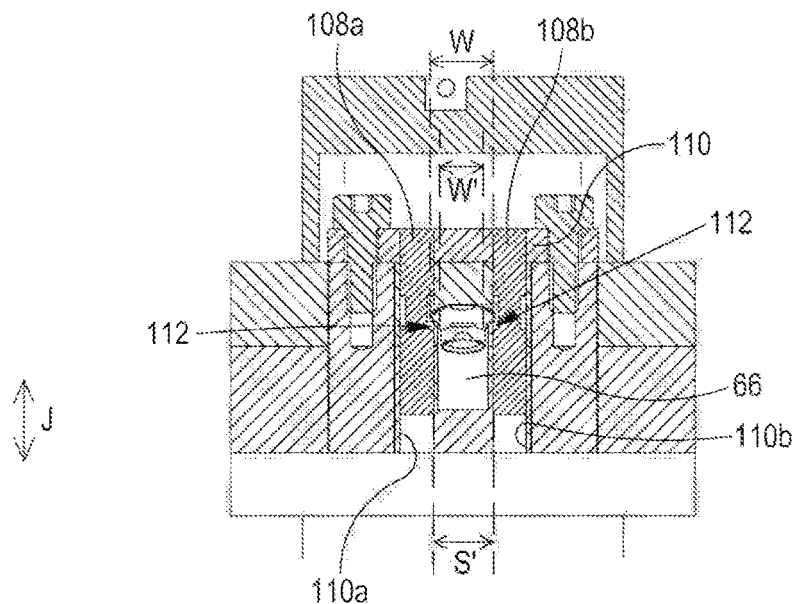
Figure 25:
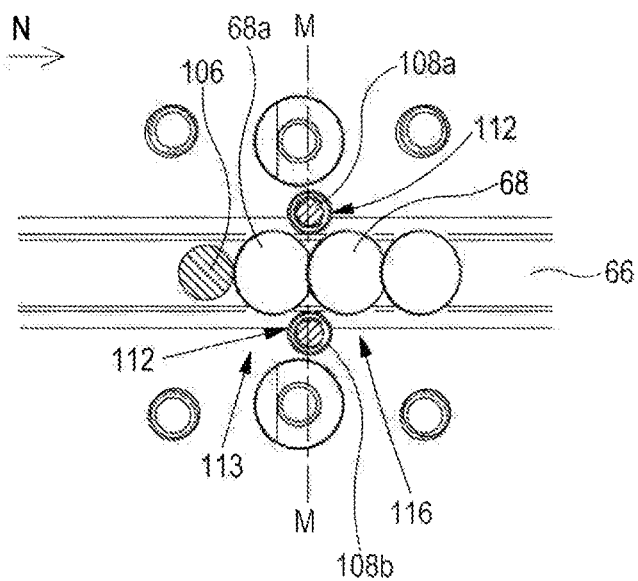
Figure 26:
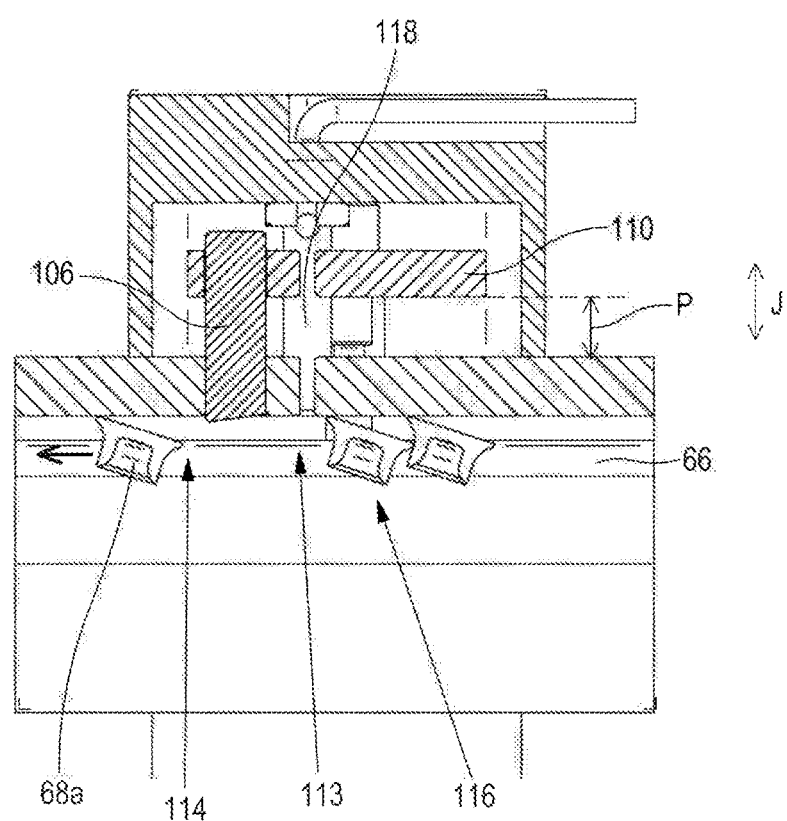
Figure 27:
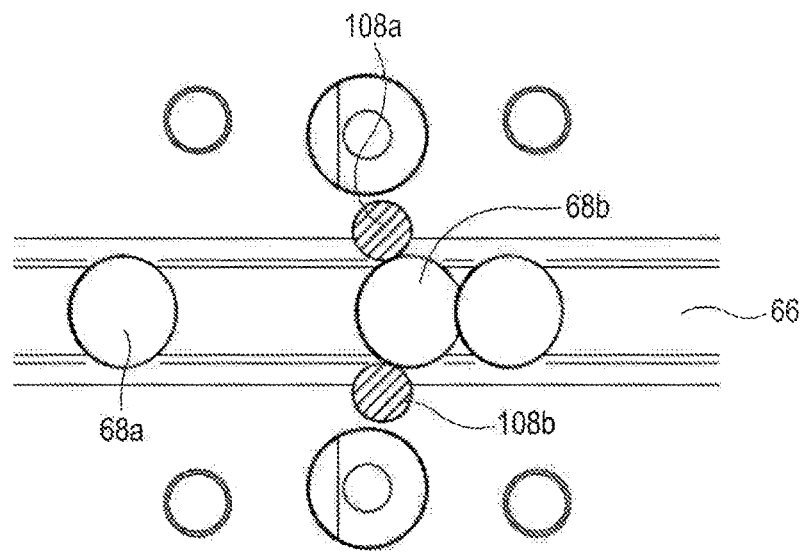
Figure 28:
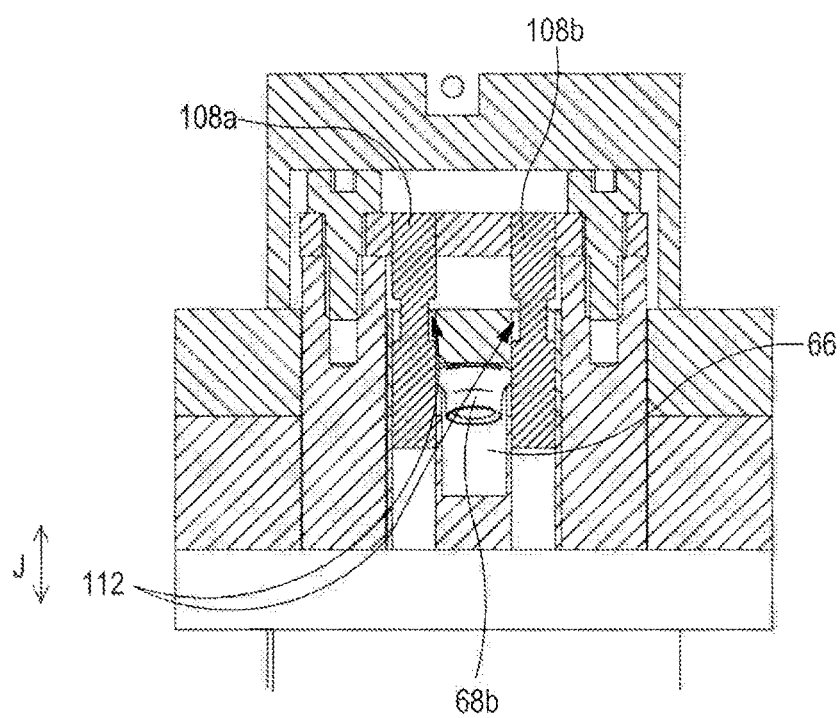

In more detail, FIGS. 23, 24 and 25 show a first configuration of the escapement mechanism of this embodiment, and FIGS. 26, 27 and 28 show a second configuration of the escapement mechanism.

FIGS. 23 and 26 are equivalent and show side elevation cross-sections of the rivet selection device. FIGS. 25 and 27 show a plan cross-sectional view in a plane perpendicular to that of FIGS. 23 and 26. The cross section is taken at line K-K viewed in the direction L. FIGS. 24 and 28 are front cross sectional views which are perpendicular to the other two sets of views previously discussed. The cross section is taken along line M-M in direction N.

Referring to the first configuration of the escapement mechanism shown in FIGS. 23 to 25, the rivet selection device 100 comprises an escapement mechanism 102. The escapement mechanism 102 has a barrier assembly 104 comprising a primary barrier 106 and two secondary barrier members 108a, 108b. The first barrier portion of the rivet selection device comprises the primary barrier 106, and the second barrier portion of the rivet selection device comprises the secondary barrier members 108a, 108b. As can be seen most clearly in the end cross-sections of FIGS. 24 and 28, the secondary barrier members 108a, 108b are located either side of the fastener conduit, which, in this case, is a T-shaped rivet conduit 66. When it is said that the secondary barrier members 108a and 108b are located either side of the rivet conduit 66, this means that they are spaced apart in a direction which is perpendicular to both the direction of travel of the rivets within the conduit and to the height (or longitudinal axis) of the rivet conveyed by the conduit 66.

As can be seen most clearly in FIG. 24, the secondary barrier members 108a, 108b are spaced by a distance S' which is less than a maximum width W of a rivet 68 carried by the rivet conduit 66, and more than a minimum width W' of a rivet 68 carried by the conduit 66. In the present embodiment the maximum width W of the rivet 68 is the maximum diameter of the head portion of the rivet 68 and the minimum width W' is the diameter of the stem portion of the rivet 68.

The barrier assembly 104 comprises a base 110 which, in use, is connected to and actuated by any appropriate linear actuator. Examples include, but are not limited to, a pneumatic actuator, or an electric actuator, such as, a solenoid. In the present embodiment the actuator is not shown for the sake of enhancing the clarity of the figures. An advantage of the above-described embodiment of rivet selection device is that a short actuation stroke is needed to escape a rivet. The short actuation length is required regardless of the length of the rivet concerned. The stroke may be in the range of 3 mm to 5 mm.

The base 110 is connected to the primary barrier 106 and the secondary barrier members 108a, 108b such that when said base is actuated by an actuator the base 110, primary barrier 106 and secondary barrier members 108a, 108b all move together. The actuator is configured to lineally translate the base 110 and attached entities upwards and downwards in the direction J.

The secondary barrier members 108a, 108b sit in respective channels 110a, 110b which each extend in the direction J.

As previously discussed, the escapement mechanism 102 shown in FIGS. 23 to 25 is in the first configuration according to the present invention. It is best seen in FIG. 28, the secondary barrier members 108a, 108b each include a recess 112. In the present embodiment, where the secondary barrier members are generally cylindrical, the recesses 112 are defined as circumferential grooves in the outer surface of the secondary barrier members 108a, 108b. Recesses may also be said to be defined by portions of the secondary barrier members 108a, 108b which have a reduced diameter. It will be appreciated that in other embodiments of the invention the secondary barrier members may have any appropriate shape and the recess in each barrier may take any appropriate form.

Returning now to FIGS. 23 to 25, as previously discussed, these show the escapement mechanism 102 of the rivet selection device 100 in a first configuration. In this first configuration the actuator has located the base 110 in a first, relatively low position in which the primary barrier 106 extends into the conduit 66. As such, in the first configuration the first barrier portion (which comprises the primary barrier 106) of the escapement mechanism is configured to block the passage of a leading fastener 68a from a first section 113 of the conduit 66 to the conduit portion 114.

In this configuration, as seen best in FIGS. 24 and 25, the base 110 is located so that the recesses 112 of both the secondary barrier members 108a, 108b define a space in the faster conduit 66 through which a rivet 68 (and in particular the head of a rivet) can pass such that the fastener can pass from the second section 116 of the conduit 66 to the first section 113.

Referring now to FIGS. 26 to 28, these show the escapement mechanism 104 of the rivet selection device 100 in a second configuration. As compared to the first configuration, the actuator has moved the base 110 upwards in the direction J by the distance P. In light of this, both the attached primary barrier 106 and the secondary barrier members 108*a*, 108*b* also undergo a linear translation upwards in the direction J by the distance P. This movement of the primary barrier 106 moves the primary barrier so that it is substantially out of the conduit 66. Because of this, the first barrier portion of the escapement mechanism which comprises the primary barrier 106 now permits the passage of the leading fastener 68*a* from the first section 113 of the conduit 66 to the conduit portion 114.

In addition, as best seen in FIGS. 27 and 28, the secondary barrier members 108*a* and 108*b* are now positioned so that the secondary barrier members 108*a* and 108*b* (and, in particular, the recesses 112 of the secondary barrier members 108*a*, 108*b*) no longer define a space in the fastener conduit through which a rivet can pass. In particular, the recesses 112 are now located outside of the conduit 66 and consequently the recesses no longer define a space in the conduit through which the rivet head can pass. It follows that, due to the fact that the diameter of the head of the rivet 68*b* is greater than the spacing between the secondary barrier members 108*a*, 108*b* the head of the rivet 68*b* contacts the secondary barrier members such that the rivet 68*b* is prevented from passing from the second section 116 of the conduit 66 to the first section 113 of the conduit. In other words, it may be said that the secondary barrier members block the rivet from passing from the second section 116 of the conduit 66 to the first section 113 of the conduit by acting as an obstacle in the path of the rivet (as compared to trapping the rivet, as occurs in the embodiment shown in FIGS. 16 to 21).

The manner in which the rivet selection device according to the present embodiment operates is substantially the same as the way in which previously discussed embodiments function. Consequently, for the sake of brevity, discussion of the operation of the present embodiment is omitted. That said, it should be noted that, within the present embodiment, the first configuration of the escapement mechanism is the same as the third configuration of the escapement mechanism as defined by the claims.

As an aside, it is worth mentioning that the embodiment shown in FIGS. 23 to 28 includes a rivet location sensor 118. The purpose of this sensor 118 is to detect whether a rivet is present at the location 113 (i.e. adjacent to the primary barrier 106) or not. If the sensor 118 produces an output signal which is indicative of the presence of a rivet at the position 113, then this may be indicative that the escapement member is in the first configuration. Conversely, if the sensor 118 outputs a sensor signal which is indicative of a rivet not being at location 113 then this may provide an indication that the escapement mechanism is in the second configuration. It will be appreciated that any appropriate sensor may be used to detect the presence or otherwise of a rivet. For example, the sensor may be an optical sensor, for example, a light gate; a capacitive sensor; or a magnetic sensor, for example a Hall effect sensor (in combination with a suitable magnetic field source).

In some embodiments which include a magnetic sensor, the first barrier portion may be provided with a magnetic field source (e.g. magnet) to assist in providing a magnetic field for the sensor which changes dependent on whether a rivet is adjacent the first barrier portion or not. In this way, the magnetic field measured by the sensor can result in a signal produced by the sensor which is indicative of the presence or otherwise of a rivet adjacent the first barrier portion.

The magnetic field source which forms part of the first barrier portion may, in some embodiments, have a further purpose. If the rivets used in combination with the rivet selection device are formed from (or comprise) a magnetic material (e.g. iron, aluminium, nickel, cobalt or rare earth elements samarium, dysprosium and neodymium), then the magnetic field source may serve to hold or trap a leading rivet when it is adjacent the first barrier portion when the escapement mechanism is in the first configuration. Such holding of the leading rivet at the primary barrier may serve to hold a rivet at the rivet transfer area. This may be beneficial in embodiments in which gravity (due to the orientation of the rivet selection mechanism) or another force may act to urge the leading rivet away from the escapement mechanism. Once the escapement mechanism enters the second configuration a motive force which drives the rivets along the conduit (e.g. compressed air) may be sufficient to overcome the attractive force provided on the leading rivet by the magnet (magnetic field source), such that the leading rivet can pass through the rivet selection device.

In some embodiments a magnetic field source may be provided which forms part of the first barrier portion, without the provision of a magnetic sensor, so as to have the benefits relating to the holding of the leading rivet at the primary barrier, as discussed above.

Figure 29:
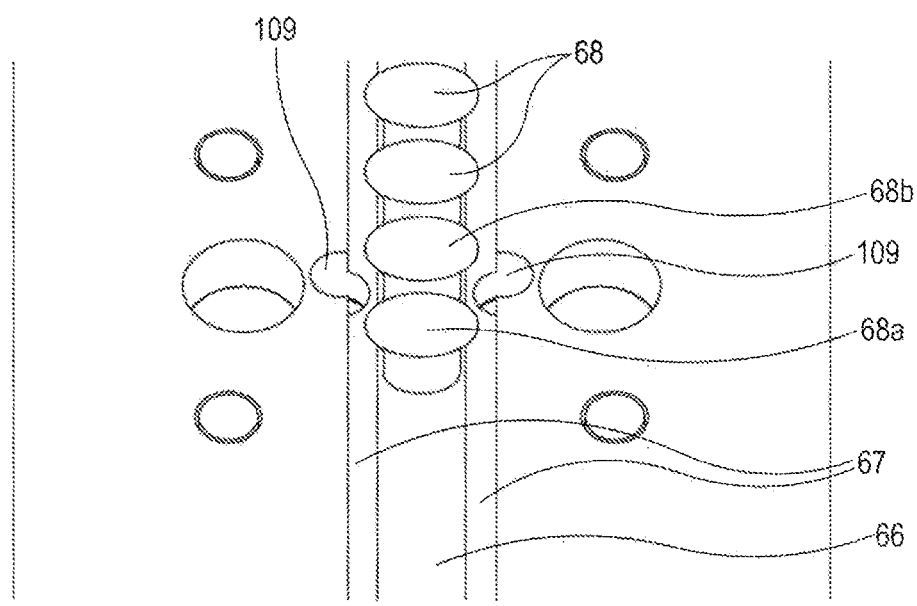

FIG. 29 shows a perspective view of a portion of the rivet selection device as shown in FIGS. 23 to 28. The view shows rivets 68 resting in the generally T-shaped conduit 66. The generally T-shaped conduit 66 is such that it includes shoulders 67 which, in use, support the heads of the rivets 68. The figure also shows apertures 109 through which the secondary barrier members 108*a*, 108*b* pass. The secondary barrier members are not shown within FIG. 29 so as to improve the clarity of the figure. It can be seen that the apertures 109 are sized and positioned so that they do not extend to the edge of the shoulders 67. This ensures that when the secondary members 108*a* and 108*b* are positioned so that the barrier members define a space in the conduit 66 through which the rivet 68 can pass, a portion of the shoulder 67 is always present. This ensures that incorporation of the barrier members into the rivet selection device according to the present invention does not result in any discontinuity in the surface of the shoulders 67 and, consequently, the risk of the rivets 68 being caught or trapped as they move along the conduit 66 is prevented.

It will be appreciated that any of the embodiments of rivet track selection device discussed above may be combined with any embodiment of rivet selection device discussed above.

In addition, any rivet selection device, rivet track selection device or combination thereof may form part of a rivet setting machine. The rivet track selection device and/or rivet selection device may be located at a nose portion of the rivet setting machine. Alternatively, they may be located at any appropriate location within the rivet setting machine.

Any rivet track selection device, rivet selection device or combination thereof may form part of a rivet magazine for use with a rivet setting machine. The rivet magazine may be removable. A rivet selection device may be of particular benefit as part of a removable rivet magazine as follows. In use, in some applications, each rivet may be released by the rivet selection device one at a time. As such, in removable rivet magazines that include a rivet selection device, at whatever time an operator removes the rivet magazine, there can only be a maximum of one rivet in the portions of the riveting machine downstream of the magazine (e.g. the chute and nose area). In usual operation, this rivet has been released by the magazine in order to be used in a desired riveting operation. It follows that in such a situation any rivet in the portions of the riveting machine downstream of the magazine, when the magazine is removed, will be used in the relevant riveting operation such that the portions of the riveting machine downstream of the magazine then no longer contain any rivets. This ensures that if the removed magazine is replaced by a magazine containing a different type of rivet, no rivet of the previous type is located downstream of the magazine. This prevents a rivet of the previous type (which may be a rivet of an incorrect type) from being used in a riveting operation after a magazine of rivets of a new, correct type is loaded onto the rivet setting machine.

Figures 30, 31:
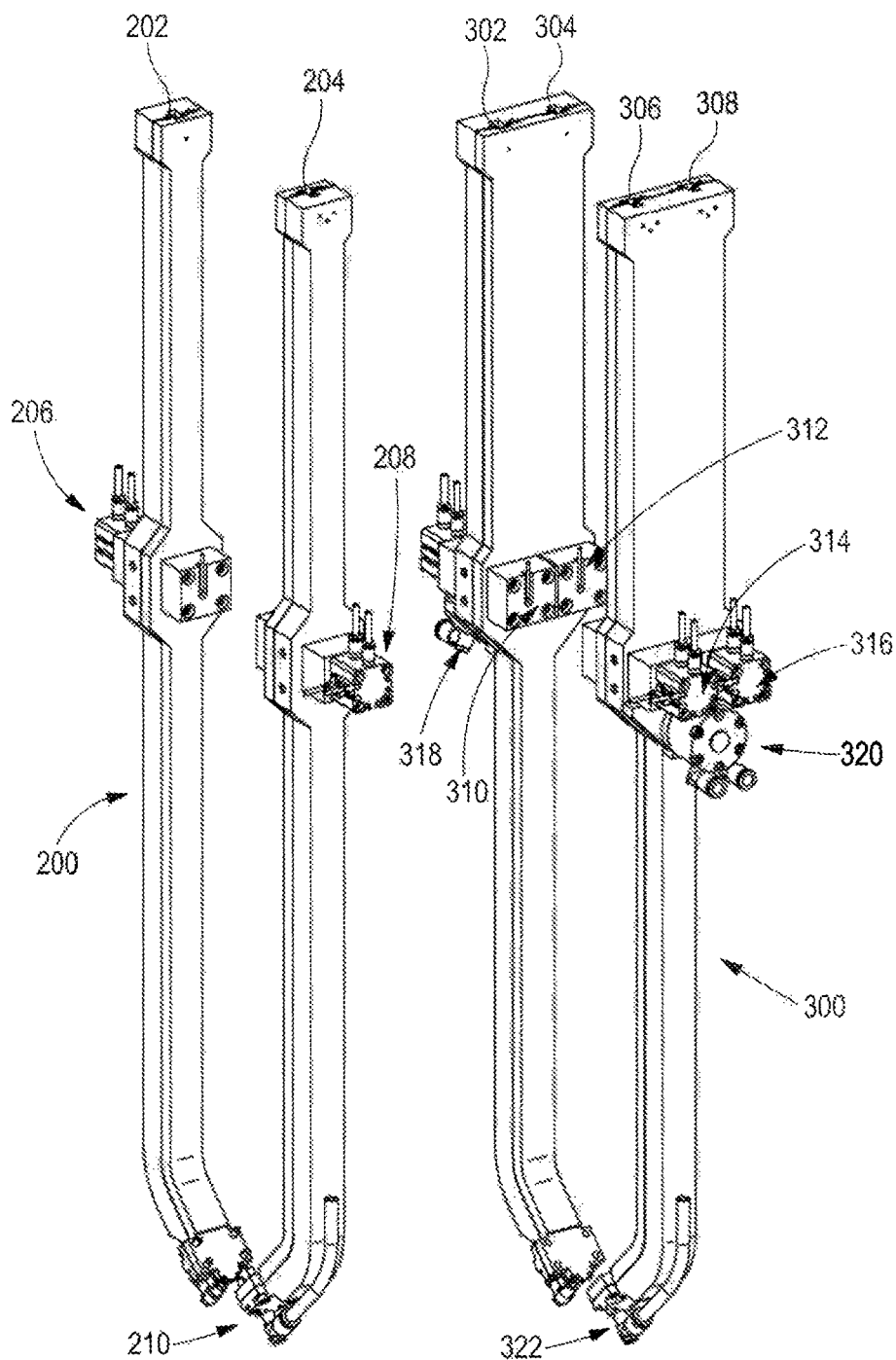
FIGS. 30 and 31 show schematic views of two different rivet magazines according to embodiments of the present invention which include rivet selection devices and/or rivet track selection devices according to embodiments of the present invention.

For completeness, in the event that the rivet type used on a rivet setting machine is always common, then, in principle, there is no need for a rivet selection device (i.e. escapement) in the magazine. For example, in the case of FIG. 30 (discussed in more detail below), the rivet selection device 208 is entirely optional and its presence or otherwise may be determined by whether there exists a suitable rivet selection device at the nose or not. Two such examples are shown in FIGS. 30 and 31. FIG. 30 shows a first magazine portion 200 and FIG. 31 shows a second magazine portion 300. The magazine portion 200 includes two single conduits 202 and 204. Each of these conduits includes a respective rivet selection device 206, 208, which may take the form of any of the rivet selection devices previously discussed. The rivet selection devices 206 and 208 are operated so as to meter out rivets from the first conduit 202 and the second conduit 204 respectively, and also to pass them to the nose portion of a rivet setting machine which would be located at 210. In use, the rivets are supplied by conduits 202 and 204 may be of the same type or may be of a different type.

The magazine portion 300 includes four rivet supply conduits 302, 304, 306 and 308. Each of the rivet supply conduits 302, 304, 306, 308 has a respective rivet selection device 310, 312, 314, 316. Of course, each of the rivet selection devices, 310, 312, 314 and 316 may be of any of the types previously discussed. The rivet selection devices 310, 312, 314 and 316 are controlled so as to meter out rivets from the supply conduits 302, 304, 306 and 308 respectively. The rivets that are metered out by the rivet selection devices 310 and 312 from rivet supply conduits 302 and 304 are supplied to a rivet track selection device 318. Likewise, the rivets that are metered out by the rivet selection devices 314 and 316 from the rivet supply conduits 306 and 308 are supplied to a rivet track selection device 320. Rivet track selection device 318 can be controlled so as to selectively determine whether a rivet metered out from rivet supply conduit 302 or 304 is passed down towards a nose of a rivet setting device which would be located at 322. Likewise, rivet track selection device 320 can be controlled to selectively determine when a metered out rivet from either rivet conduit supply 306 or 308 is supplied downstream to the location 322 of the nose portion of the rivet setting device.

Figure 32:
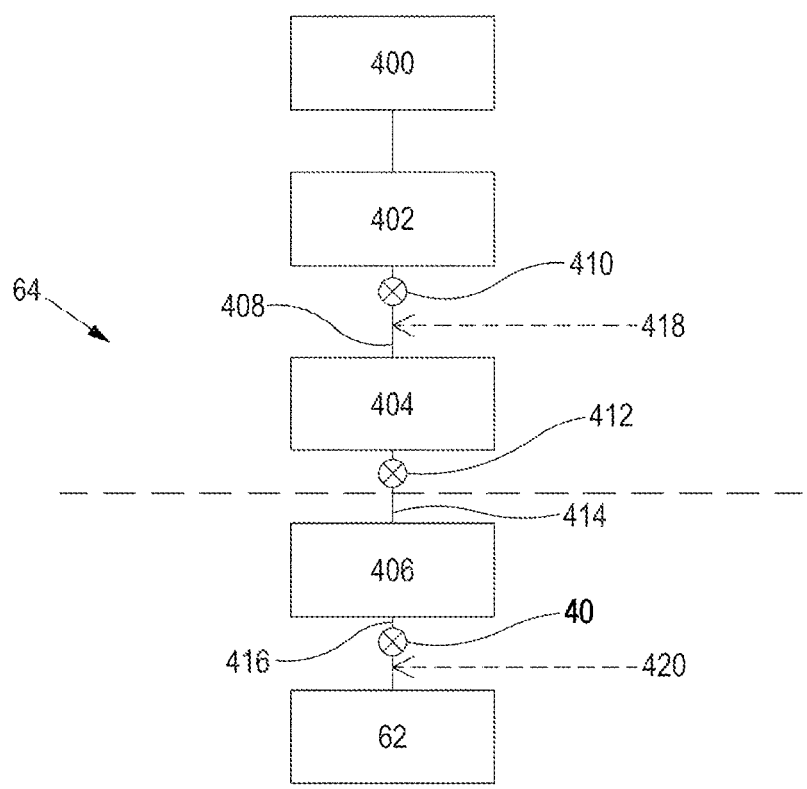
FIG. 32 shows a schematic view of a portion of a fastener setting machine according to an embodiment of the present invention.

FIG. 32 shows a highly schematic view of a portion of a fastener setting machine in accordance with several aspects of the present invention. The rivet setting machine 64 (which may also be referred to as a rivet setting device) includes a fastener source 400. A feed device 402, a loading station 404, a magazine 406 and a nose portion 62. In the presently described embodiment the fasteners concerned are rivets, however, in other embodiments, the fasteners may be any appropriate type of fastener.

In use, rivets stored at the fastener source 400 are fed into the feed device 402. The purpose of the feed device is to correctly orientate each of the rivets, and ensure that they have been separated from one another, prior to the rivets being loaded into a first feed conduit 408. The feed device 402 may be any appropriate type of feed device provided that it can carry out the alignment and separation functions as discussed above. In one embodiment the feed device 403 may be a vibratory feed bowl of a type well known in the art.

The conduit 408 links the feed device 402 and loading station 404. In one particular embodiment, where the fasteners concerned are rivets (e.g. self-piercing rivets) the conduit may be referred to as a T-tube, the T-tube having a generally T-shaped cross section perpendicular to the direction of movement of the rivets through the first feed conduit 408. A first transfer gate 410 located in-line with the first feed conduit 408 is provided to selectively permit or prevent rivets from passing from the feed device 402 to the loading station 404 via the first transfer gate 410. A second transfer gate 412 is located as part of the loading station 404 or downstream thereof. The location of the second transfer gate 412 may be anywhere upstream of the magazine 406 and downstream of the first transfer gate 41.

The magazine 406 and nose portion 62 may be mounted to a moveable robot. The moveable robot (not shown) may move the magazine 406 and nose portion 62 from a first, loading position (as shown in FIG. 32) to a second, riveting position at which the nose portion 62 is located at a desired position in order to carry out a riveting operation. In the loading position a second rivet feed conduit 414 (or T-tube) links the loading station 414 to the magazine 406. The second transfer gate 412 is selectively moveable between a first configuration which rivets can pass from the loading station to the magazine, when the magazine is at the loading position, via the second fee conduit 414 and second transfer gate 412, and a second configuration in which rivets cannot pass the second transfer gate 412.

Finally, the rivet setting machine 64 includes a third feed conduit 416 (or T-tube) which links the magazine 406 to the nose portion 62. An escapement mechanism 40, of the type described previously within the present application, is located in-line with respect to the third feed conduit 416. In other embodiments the escapement mechanism 40 may form part of the magazine 406 or nose portion 62, provided that it is upstream of at least a portion of the nose portion 62. The escapement mechanism 40 has various configurations which have already been described in great detail above.

The nose portion 62 includes a punch (not shown) which is configured to assist in setting a rivet in a target workpiece when said workpiece is located adjacent to the nose portion 62.

Before moving on, it will be appreciated that although first, second and third feed conduits 408, 414 and 416 are shown as separate entities which extend between the feed device and the loading station, the loading station and the magazine, and the magazine and the nose portion, respectively; the first, second and third feed conduits 408, 414, 416 may be considered to form a single conduit (which passes through each of the loading station, magazine and nose portion when the magazine and nose portion are in the loading position) or two separate conduits (one passing through the loading station 404, and the other passing through the magazine 406 and nose portion 62 when the magazine 406 and nose portion 62 are located in a position other than the loading position).

In use, the rivet setting machine 64 operates to feed a rivet from the fastener source 400 to the nose portion 62 as follows.

The rivets pass from the fastener source 400 to the feed device 402 and are aligned thereby so as to enable them to pass into the first feed conduit 408. As previously discussed, the first feed conduit 408 (in addition to the second feed conduit 414 and third feed conduit 416) may take the form of a T-tube in the case where the fasteners being conveyed by the conduits are rivets. The rivets which pass into the first feed conduit 408 from the feed device 402 are initially held in place within the conduit 408 by the transfer gate 410. When it is desired for one or more rivets to move along the conduit 408 to the loading station 404 the transfer gate 410 is opened. The rivets pass to the loading station 404 and are held in place within the second feed conduit 414 by the second transfer gate 412.

Once the magazine 406 and nose portion have moved into the loading position as shown in FIG. 32, the second transfer gate 412 can be opened so that the rivets move from the loading station 404 along the second feed conduit 414 to the magazine 406.

In known rivet setting machines one or more bursts of compressed air may be used to move the rivets along the conduits 408, 414 so as to move the rivets from the feed device 402 to the magazine 406. In some applications the magazine 406 and nose portion 62 may only be located at the loading position for a limited period of time between riveting operations (for example 3 seconds or less). As such, there is limited time for rivets stored in the fastener source to be transferred to the magazine 406.

Once the rivets are located within the magazine 406 the magazine 406 and nose portion 62 may be moved away from the loading position to a desired position for a riveting operation to take place. When a riveting operation is required, the escapement mechanism 40 is operated as previously discussed so as to enable a single rivet to pass through the escapement mechanism 40 along the conduit 416 to the nose portion 62. Once the rivet is received at the nose portion 62 the punch of the nose portion 62 can be used to set the rivet in the workpiece as required. In a similar manner to the movement of the rivets between the feed device 402 and magazine 406, movement of the rivet between the magazine 406 and the nose portion 62 via conduit 416 and escapement mechanism 40 may be effected in known rivet setting machines by using one or more bursts of compressed air supplied at a location upstream of the rivet to be moved.

In each of the situations discussed above in which compressed air is used to move one or more rivets along the various conduits, air pressures between two and four bar may be used to accelerate the rivets through the T-tube conduits. For completeness, the person skilled in the art knows that longer rivets require a lower pressure of compressed air to avoid excessive rivet velocity that can damage components when the moving rivet or rivets contacts a stationary component. Conversely, a short rivet generally requires higher pressure.

The Applicant has found that there are several disadvantages to using compressed air to accelerate rivets within the T-tube conduit. First, the Applicant has observed that when compressed gas initially interacts with one or more rivets to be accelerated, the rivet experiences vibration or flutter as it accelerates from its static position. This vibration or flutter causes the rivet to contact the internal surfaces of the conduit. Such contact creates erosion and wear within the conduit which is undesirable. Such contact also means that some of the energy provided to the rivet or rivets to be accelerated is wasted as friction.

Without wishing to be bound by theory, it is thought that the initial vibration or flutter of the rivet being moved by the compressed gas may be due to one or more of several different effects. First, when the compressed air enters the conduit, it immediately mixes with stationary gas that is already present within the system. This may create a turbulent mixture of gases which results in non-uniform movement of the air within the system, and, hence, non-uniform movement of the rivet. Secondly, the static rivet may suddenly be moved by the compressed air in a non-laminar manner. It is desirable to alleviate current wear issues caused by the above discussed initial acceleration of a static rivet in the conduit.

In addition to the wasted energy which results from the friction between the transported rivets and conduit, compressed air is a consumable which must be generated. As such, it is desirable to provide a rivet setting machine which transports rivets along a conduit in a more efficient manner in which compressed air consumption and/or energy consumption is reduced.

Finally, in order for compressed air to be used to propel one or more rivets along the conduit, the compressed air has to be introduced in a direction which is generally sideways to the direction of the conduit and one direction along the conduit (i.e. the direction which is opposite to that of the desired movement of the rivet) has to be sealed to prevent the introduced compressed air from travelling in the wrong direction and hence not causing the desired movement of the one or more rivets. The requirement to block or seal one of the directions along the conduit in order to use the compressed air to urge one or more rivets in the correct direction along the conduit can be inconvenient. As such, it is desirable to provide an alternative method of propelling one or more rivets along the conduit.

In accordance with an embodiment of the present invention the Applicant has replaced the compressed air used to propel rivets along the conduits 408, 414, 416 with a pair of air amplifiers located at the positions indicated by dashed lines 418 and 420 respectively. The operating principals behind an air amplifier (which may also be referred to as an air mover) are well known and so are not set out in detail here.

However, for the sake of completeness, some of the basic principles are now explained. An air amplifier is an air flow amplifier. It uses energy from a small volume of compressed air to produce a high velocity, high volume, relatively low pressure output airflow. The compressed air is provided to the air amplifier via a nozzle. The nozzle relies on the Coanda effect to change the direction of the supplied compressed air so that it travels down a main flow conduit in a downstream direction. The flow of the compressed air via the nozzle into the flow conduit in the downstream direction causes three times the amount of compressed air introduced into the main flow conduit to be sucked from a location in the main flow conduit upstream of the nozzle and blown to the downstream portion of the main flow conduit. In light of the compressed air supplied by the nozzle and the sucked air both passing downstream of the nozzle, the amount of air flow produced by the air amplifier downstream of the nozzle in the main flow conduit is four times the amount of compressed air supplied to the nozzle. It will be appreciated that the air amplifier creates a region of suction or relative vacuum in the main flow conduit upstream of the nozzle, and a discharge zone at a relatively elevated pressure in the main conduit downstream of the nozzle.

As discussed, in the embodiment shown in FIG. 32, air amplifiers may be located at each of the positions 418 and 420. In this manner, when activated, the air amplifier 418 draws one or more rivets from the feed device 402 to the loading station 404 via the conduit 408 and transfer gate 410 (when in an open configuration). Similarly, the air amplifier 420 can draw one or more rivets from the magazine 406 to the nose portion 62 and beyond via the conduit 416 and escapement mechanism 40 when the escapement mechanism allows a rivet to pass. When the magazine 406 and nose portion 62 are located in the loading position as shown in FIG. 32, the discharged air produced by the flow amplifier 418 and/or the sucked air consumed by the air amplifier 420 can propel one or more rivets from the loading station 404 to the magazine 406 via the conduit 414 and transfer gate 412 (whilst the transfer gate 412 is open).

In some embodiments only a single air amplifier 418 or 420 may be required. In such an instance the single air amplifier would use suction to accelerate all the rivets upstream of the air amplifier and use the discharged air to accelerate all of the rivets downstream of the air amplifier. However, it will be appreciated that in the example shown in FIG. 32, if only a single air amplifier were to be used, it would only be possible for an air amplifier to exert an accelerating force on a rivet at any location within the system between the feed device 402 and nose portion 62 when the magazine 406 and nose portion 6 are in the loading position such that the conduit 414 extends between the loading station 404 and magazine 406.

In other embodiments more than two air amplifiers may form part of the feed conduit of the rivet setting machine. The one or more air amplifiers which form part of the feed conduit of the rivet setting machine may be located at any appropriate location along the feed conduit.

Figure 33:
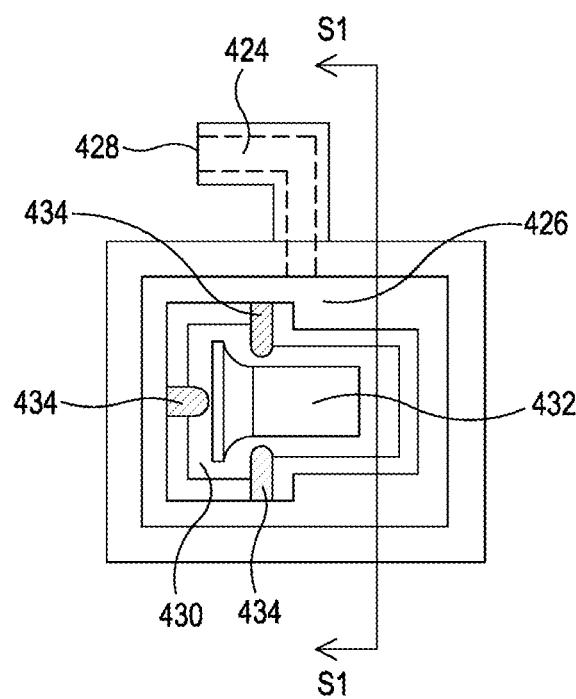
FIGS. 33 and 34 show schematic cross-sectional views of an air amplifier which forms part of a fastener setting machine according to an embodiment of the present invention.
Figure 34:
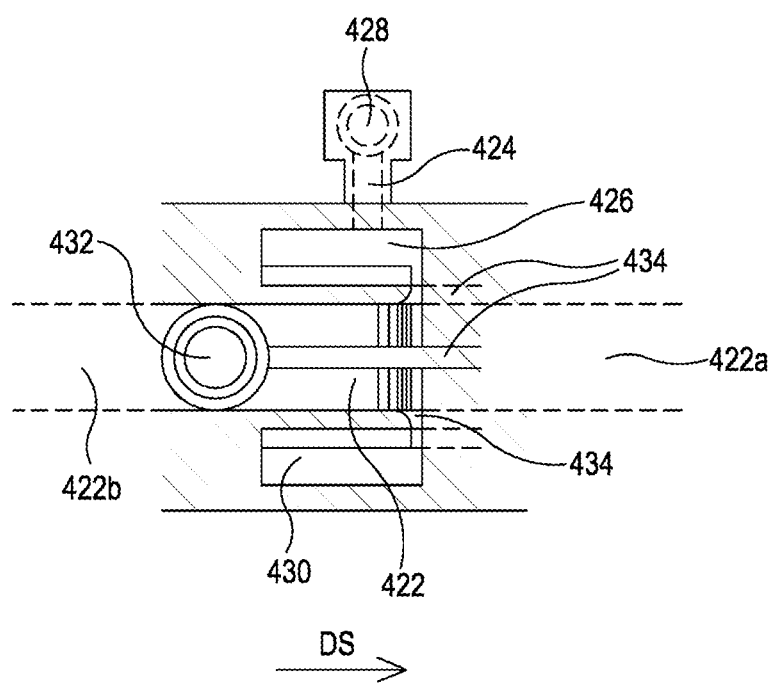

Each of the air amplifiers 418, 420 within FIG. 32 is of the same form and is shown in the schematic cross sectional views in FIGS. 33 and 34. The cross sectional view in FIG. 34 is taken at the position and direction indicated by the line S1 within FIG. 33.

Known air amplifiers include a main flow conduit which is generally circular in cross section in a plane perpendicular to the direction of flow of air through the flow conduit. In such known air amplifiers the nozzle adjoins the main flow conduit such that the nozzle terminates with a generally annular groove in an inner wall of the main flow conduit.

Such an arrangement has been found by the Applicant to be inappropriate for transporting fasteners (and, particular rivets). The reason for this is that the rivets having a generally T-shaped cross section include a number of edges. Examples of such edges are the edge at the widest portion at the head of the rivet, and the edge at the very base of the rivet. Such portions of the rivet may get caught in the generally annular groove of the air amplifier. This may lead to wear of the wall of the main flow conduit of the air amplifier and/or may lead to the rivets moving along the main conduit in an unstable and unpredictable manner. Both of these issues may result in the rivets passing along the conduit at a reduced speed as compared to the maximum possible transfer speed of the rivets.

In light of the above-described disadvantages with known air amplifiers, the Applicant has developed their own design of air amplifier. This is the air amplifier shown in FIGS. 33 and 34.

The air amplifier according to the present invention includes a main flow conduit to which compressed air is supplied via a nozzle conduit 424 and nozzle 426. The nozzle 426 is located at a first end of the nozzle conduit 424. At a second end of the nozzle conduit 424 there is provided a connection portion 428 for connecting to a source of compressed air (not shown). In use, the compressed air is supplied from the source of compressed air and via the nozzle conduit 424 to the nozzle 426 and vents to the main flow conduit 422.

What differentiates the air amplifier according to the present invention from known air amplifiers is the structure of the nozzle. In particular, the air amplifier includes a nozzle chamber 430 which surrounds a portion of the conduit 422. As previously discussed, the air amplifier is configured to inject compressed air (via the nozzle conduit 424 and nozzle 426) into the main flow conduit 422 so that the injected compressed air flows in a downstream direction (indicated in FIG. 34 by DS). The injected compressed air flows in said downstream direction DS towards a downstream portion of the conduit 422 and said compressed air pulls air from an upstream portion of the conduit 422B of the conduit 422 towards said downstream position 422A. Movement of the air from the upstream portion 422B (upstream of the nozzle) to the downstream portion 422A (downstream of the nozzle) causes one or more of the fasteners 432 located in the conduit 422 to be propelled along the conduit 422 from the upstream portion of the conduit 422B to the downstream portion of the conduit 422A.

In the present embodiment, the conduit 422 has a generally T-shaped cross section (perpendicular to the direction in which said fasteners are propelled along the conduit) which is suited for the conduit to carry rivets. However, in other embodiments, the conduit may have any appropriate cross sectional shape which is suited to carrying the particular type of fastener concerned.

In the present embodiment the air amplifier includes a plurality of guide members located in the nozzle chamber 430. The guide members are shaped and positioned so as to be configured to guide a fastener through the nozzle chamber 430 from said upstream portion 422B to said downstream portion 422A. In particular, the guide members may be shaped and positioned so that at least a portion of each guide member is located adjacent a fastener 432 as it passes through the nozzle chamber 430, such that, in use, the fastener 432 can contact one or more of the guide members so as to constrain the path of the fastener 432 and thereby guide it through the nozzle chamber 430.

Figure 35:
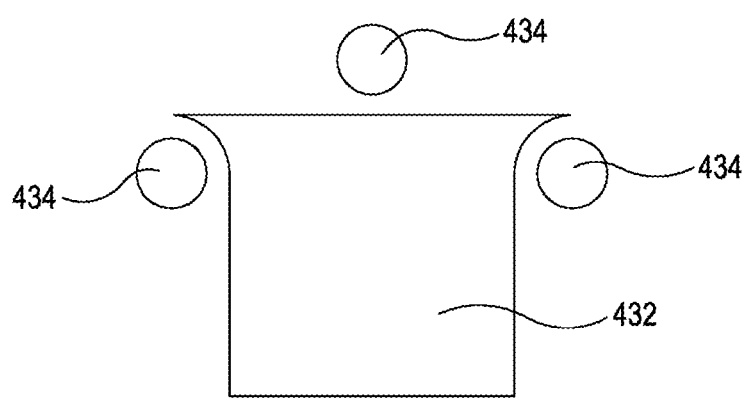
FIG. 35 shows a rivet supported by rails which form part of an air amplifier which forms part of a fastener setting machine according to an embodiment of the present invention.

In the present embodiment the plurality of the guide members take the form of a plurality of rails 434 which extend generally parallel to one another and generally parallel to the direction of travel of the conduit as it passes through the air amplifier. Consequently, the guide rails also extend parallel to the direction of travel of the fasteners as they travel through the air amplifier. FIG. 35 shows a schematic view of a fastener in the form of a rivet located within the nozzle chamber of the air amplifier such that it is supported by the rails 434. In use the rails 434 guide the fastener 432 through the nozzle chamber 430 from the upstream position 422B to the downstream position 422A.

The rails 434 are located relative to one another such that the two lower rails as seen in FIG. 35 are spaced by a distance which is greater than the diameter of a shank portion of the rivet 432, but less than the maximum diameter of the head portion of the rivet 432. In this way the head of the rivet can be supported by the two lower rails 434 as shown in FIG. 35. It may also be said that a shoulder portion of the rivet, which is located between the head of the rivet and the shank of the rivet, is supported by the two lower rails 434. A third, upper rail is located centrally over the head of the rivet 432. This ensures that the rivet 432 cannot move a sufficient distance in the upward direction as shown in FIG. 35 so as to unseat the rivet 432 from the lower pair of rails.

It will be appreciated that although the guide members of the present embodiment of air amplifier are a particular shape and arrangement of rails, in other embodiments this need not be the case. Any appropriate number, shape and location of guide member may be used, provided that the guide member is suitable for guiding a fastener through the nozzle chamber 430 from said upstream position of the conduit to a downstream position of the conduit.

By using guide members to support the rivet 432 as it passes through the nozzle chamber 430 from the upstream portion 422B to the downstream portion 422A, this enables the compressed air injected into the nozzle chamber 430 to pass between the guide members to contact a fastener 432 passing through the nozzle chamber 430 so as to propel the fastener from the upstream portion 422B to the downstream portion 422A via the nozzle chamber 430 of the air amplifier.

The advantage of using a nozzle chamber in combination with the guide members is that the air amplifier does not include any features in the conduit which may cause the fasteners passing along the conduit to catch within the conduit. Consequently, movement of the fasteners along the conduit is unhindered by the presence of the air amplifier.

As discussed already, it is envisaged that an air amplifier according to the present invention could be positioned at any appropriate location along the fastener feed conduit between the feed device and the nose portion. In such examples, air has to be able to move along all portions of the feed conduit (i.e. so that the air upstream of the air amplifier can be pulled towards the air amplifier and air downstream of the air amplifier can be discharged or pushed). It is particularly important that air can be pulled from upstream of the air amplifier otherwise air amplifier would not be able to function. To this end in embodiments of the invention which include an air amplifier, it is helpful if any transfer gates, escapement mechanisms and in-line fastener track selection devices are such that they always allow air flow in the conduit through them, even when they are in a position in which they retain or block a fastener from moving along the conduit. This is the case for all the in-line fastener track selection devices and in-line fastener selection devices which have already been discussed within this document.

The ability to locate an air amplifier according to the present invention at any position along the fastener feed conduit has several benefits.

First, known apparatus for propelling fasteners along a feed conduit include vacuum devices. With such devices the vacuum source has to be located at the nose portion in order to pull a rivet all the way through the system. This can lead to increased complexity at the nose portion of the rivet setting machine where spaces usually are at a premium. Because an air amplifier can be located anywhere along the feed conduit, it can be located away from the nose portion.

In addition, as already discussed above some known arrangements for propelling rivets along a feed conduit utilize compressed air. These types of arrangement require a portion of the conduit to be sealed during use to thereby ensure that the compressed air (and hence propelled rivets) do not travel in the wrong direction down the conduit. The requirement to be able to seal portions of the feed conduit lead to relatively complicated designs to achieve this. For example, it may be necessary to seal the upstream portion of the magazine which makes the magazine more complicated and is a potential failure point for the relevant rivet setting machine.

Another advantage is that, as compared to the use of compressed air to propel the rivets along the feed conduit, the use of suction provided by the air amplifier means that a single air amplifier can be located downstream of an inline fastener track selection device because, regardless which track is selected by the inline fastener track selection device, the suction produced by an air amplifier will be able to move the rivets. To the contrary, if compressed air is used to propel a rivet along the rivet feed conduit, should the rivet feed conduit include an inline fastener track selection device in which the fastener track selection device selects a single upstream track from a plurality of upstream tracks, then each of the plurality of upstream tracks will require its own compressed air source.

Finally, the use of an air amplifier allows rivets upstream of an air amplifier to be acted upon by the suction provided by the air amplifier. This means that if a plurality of rivets are located in the feed conduit, it is the first rivet (i.e. the rivet which needs to be advanced) which is acted on directly by the suction force. To the contrary, using a compressed air system, if there are a plurality of rivets in the rivet feed conduit, the compressed air will act on the most upstream rivet (i.e. the rivet which is closest to the compressed air source). Consequently, in order to move the desired rivet at its relatively downstream location, it is necessary to move all of the other rivets within the system. It will be appreciated that this is inefficient.

It is worth noting that, due to the relative complexity of combining an air amplifier nozzle with the T-tube conduit, it is envisaged that at least the nozzle chamber of the air amplifier may be 3D printed.

In some embodiments the magazines may be removable. In addition, in some embodiments, the rivet track selection device(s) and/or rivet selection device(s) which form part of a magazine may be passive and may only actuated by one or more actuators which form part of the rivet setting device, such that the rivet track selection device(s) and/or rivet selection device(s) are only actuated once the magazine has been mounted to a rivet setting device.

The invention also encompasses methods which are equivalent to the aforementioned apparatus. Such methods may also extend to manufacturing a product (for example a vehicle) where the method comprises fastening together two or more layers of a workpiece using a rivet setting machine, magazine and/or method as discussed above.

It will be appreciated that although all of the described embodiments of rivet track selection device and rivet selection device are such that their actuators are located on the same side of the rivet conduit as the relevant rotor or actuation base, in other embodiments the actuator and relevant rotor or actuation base may be located on opposite sides of the conduit.

The design of the rotary escapement mechanism with respect to the housings can be bi-directional, or at least mounted 180 degrees opposite to provide for the aforementioned configurations of two rivet supply conduits into a single rivet supply conduit and vice versa. The same would apply for the linear barrier arrangement whereby the mounting (including the first barrier portion) can be rotated through 180 degrees about the pair of second stage pins (Line M-M in FIG. 25) to be operable in the alternate flow configuration.

In some embodiments it may be desirable to have two escapement mechanisms adjacent to one another, spaced along the direction of travel of the rivets through the conduit. In this way, not only could the leading or trailing rivet be held against movement by a first one of the escapement mechanism, as already discussed, but, additionally, the second escapement mechanism could hold the trailing rivet or rivet behind that.

In some embodiments the escapement mechanism of a rivet selection device of the type discussed above including two secondary barrier members may additionally include one or more tertiary barrier members. The one or more tertiary barrier members may be spaced from the secondary barrier members in a direction opposite to the travel direction of rivets through the system by a distance equal to or greater than the maximum diameter of the rivets used. The one or more tertiary barrier members may be actuated by the same actuator that actuates the first and second barrier members, or may be actuated by any other appropriate actuator. The one or more tertiary barrier member may be controlled in combination with the secondary barrier members to trap a post-trailing rivet (i.e. a rivet located behind the trailing rivet in the direction of travel of the rivets. This ensures that a further rivet is held ready to take place in a riveting operation if the rivet selection device undergoes significant movement (for example, during the movement of a robot arm to which a rivet setting machine of which the rivet selection device forms part is mounted).

In the embodiments of rivet track selection devices and rivet selection devices discussed above, the devices may further comprise a source of compressed gas. Compressed gas may be supplied to the conduit from the source of compressed gas to urge the fasteners to travel down the conduit. The source of compressed gas may be configured to supply compressed gas to the conduit at a location upstream of the rivet track selection device or rivet selection device, such that the supplied compressed gas can exert a force on a fastener to travel from upstream of said rivet track selection device or rivet selection device, through said rivet track selection device or rivet selection device, and then downstream of the rivet track selection device or rivet selection device. In this way the rivet track selection device or rivet selection device acts as a duct through which the compressed gas can pass from the conduit upstream of the rivet track selection device or rivet selection device, to downstream of the rivet track selection device or rivet selection device.

Whilst the above-described embodiments relate to rivet track selection devices and rivet selection devices which may form part of a rivet setting device, it will be appreciated that the present invention is applicable to any appropriate fastener. For example, the invention may be used in conjunction with nails, bolts, studs or screws.

The invention claimed is:

1. An in-line fastener selection device comprising fastener conduit having a first fastener conduit portion and a second fastener conduit portion, and an escapement mechanism located between the first and second fastener conduit portions;
wherein the escapement mechanism has:
a first configuration in which a first barrier portion of the escapement mechanism is configured to block the passage of a leading fastener from a first section of the second fastener conduit portion to the first fastener conduit portion;
a second configuration in which the first barrier portion of the escapement mechanism is configured to permit the passage of the leading fastener from the first section of the second fastener conduit portion to the first fastener conduit portion, and a second barrier portion of the escapement mechanism is configured to block the passage of a trailing fastener from a second section of the second fastener conduit portion to the first section of the second fastener conduit portion; and
a third configuration in which the second barrier portion of the escapement mechanism is configured to permit the passage of the trailing fastener from the second section of the second fastener conduit portion to the first section of the second fastener conduit portion, and the first or second barrier portion of the escapement mechanism is configured to block the passage of the trailing fastener from the first section of the second fastener conduit portion to the first fastener conduit portion.

2. The in-line fastener selection device according to claim 1, wherein
in the first configuration the first barrier portion of the escapement mechanism is located in a first position and the second barrier portion of the escapement mechanism is in a second position; and
in the second configuration the first barrier portion of the escapement mechanism is in a third position, and the second barrier portion of the escapement mechanism is in a fourth position; and
wherein the device is configured such that the first barrier portion is actuable from the first position to the third position coupled with the second barrier portion being actuated from the second position to the fourth position.

3. The in-line fastener selection device according to claim 1, wherein
in the second configuration the first barrier portion of the escapement mechanism is in a third position, and the second barrier portion of the escapement mechanism is in a fourth position; and
in the third configuration the second barrier portion of the escapement mechanism is configured to block the passage of the trailing fastener from the first section of the second fastener conduit portion to the first fastener conduit portion, and the second barrier portion of the escapement mechanism is in a fifth position, and the first barrier portion of the escapement mechanism is in a sixth position, wherein the device is configured such that the first barrier portion is actuable from the third position to the sixth position coupled with the second barrier portion being actuated from the fourth position to the fifth position.

4. The in-line fastener selection device according to claim 1, wherein
in the second configuration the first barrier portion of the escapement mechanism is in a third position, and the second barrier portion of the escapement mechanism is in a fourth position; and
in the third configuration the first barrier portion of the escapement mechanism is configured to block the passage of the trailing fastener from the first section of the second fastener conduit portion to the first fastener conduit portion, and the second barrier portion of the escapement mechanism is in the second position, and the first barrier portion of the escapement mechanism is in the first position, wherein the device is configured such that the first barrier portion is actuable from the third position to the first position coupled with the second barrier portion being actuated from the fourth position to the second position.

5. The in-line fastener selection device according to claim 1, wherein the device is configured such that the escapement mechanism oscillates between the second and third configurations.

6. The in-line fastener selection device according to claim 1, wherein the escapement mechanism has a fourth configuration in which the first barrier portion and/or the second barrier portion are configured to hold the leading fastener or trailing fastener within the escapement mechanism such that the leading fastener or trailing fastener is not free to exit the escapement mechanism.

7. The in-line fastener selection device according to claim 1, wherein, in use, the first and second barrier portions are configured to contact a head portion of the leading and trailing fasteners and/or the first and second barrier portions are configured to contact a stem portion of the leading and trailing fasteners.

8. The in-line fastener selection device according to claim 1, wherein a rotor of the escapement mechanism rotates about a rotation axis, relative to a stator, between the first and second configurations, and between the second and third configurations.

9. The in-line fastener selection device according to claim 8, wherein the rotor comprises a base from which first and second pins extend in a direction generally parallel to the rotation axis; wherein the first barrier portion comprises the first pin and the second barrier portion comprises the second pin.

10. The in-line fastener selection device according to claim 8, wherein the rotor comprises a base from which a pawl extends in a direction generally parallel to the rotation axis; wherein the first barrier portion comprises a first end of the pawl and the second barrier portion comprises a second end of the pawl.

11. The in-line fastener selection device according to claim 10, wherein the pawl is generally arcuate in cross-section perpendicular to the rotation axis.

12. The in-line fastener selection device according to claim 8, further comprising an actuator configured to rotate the rotor relative to the stator.

13. The in-line fastener selection device according to claim 12, wherein the actuator is a rotary actuator or a linear actuator.

14. The in-line fastener selection device according to claim 1, wherein the escapement mechanism translates between the first and second configurations, and between the second and third configurations.

15. The in-line fastener selection device according to claim 14, wherein said translation is generally linear.

16. The in-line fastener selection device according to claim 14, wherein the escapement mechanism comprises a barrier assembly comprising a primary barrier and two secondary barrier members; wherein the first barrier portion comprises the primary barrier, and the second barrier portion comprises the secondary barrier members.

17. The in-line fastener selection device according to claim 16, wherein the secondary barrier members are located either side of the fastener conduit.

18. The in-line fastener selection device according to claim 16, wherein the secondary barrier members are spaced by a distance which is less than a maximum width of a fastener carried by the fastener conduit.

19. The in-line fastener selection device according to claim 16 wherein, when the escapement mechanism is in the second configuration, the secondary barrier members extend into the fastener conduit.

20. The in-line fastener selection device according to claim 16, wherein the secondary barrier members each include a recess, the recess being sized and positioned such that:

in the third configuration of the escapement mechanism the recesses of both of the secondary barrier members define a space in the fastener conduit through which a fastener can pass, such that the fastener can pass from the second section of the second fastener conduit portion to the first section of the second fastener conduit portion; and in the second configuration of the escapement mechanism the recesses of both of the secondary barrier members do not define a space in the fastener conduit through which a fastener can pass, such that the fastener is prevented from passing from the second section of the second fastener conduit portion to the first section of the second fastener conduit portion.

21. The in-line fastener selection device according to claim 16, wherein the primary barrier and secondary barrier members are mounted to an actuation base.

22. The in-line fastener selection device according to claim 16, wherein, when the escapement mechanism is in the first configuration, the primary barrier extends into the fastener conduit.

23. A fastener setting machine comprising an in-line fastener selection device, the in-line fastener selection device comprising fastener conduit having a first fastener conduit portion and a second fastener conduit portion, and an escapement mechanism located between the first and second fastener conduit portions;

wherein the escapement mechanism has:

a first configuration in which a first barrier portion of the escapement mechanism is configured to block the passage of a leading fastener from a first section of the second fastener conduit portion to the first fastener conduit portion;

a second configuration in which the first barrier portion of the escapement mechanism is configured to permit the passage of the leading fastener from the first section of the second fastener conduit portion to the first fastener conduit portion, and a second barrier portion of the escapement mechanism is configured to block the passage of a trailing fastener from a second section of the second fastener conduit portion to the first section of the second fastener conduit portion; and a third configuration in which the second barrier portion of the escapement mechanism is configured to permit the passage of the trailing fastener from the second section of the second fastener conduit portion to the first section of the second fastener conduit portion, and the first or second barrier portion of the escapement mechanism is configured to block the passage of the trailing fastener from the first section of the second fastener conduit portion to the first fastener conduit portion.

24. A fastener setting machine according to claim 23, wherein the in-line fastener selection device is located at a nose portion of the fastener setting machine, such that the first fastener conduit portion is a standby position at which a fastener sits before it is struck by a punch of the fastener setting machine, and such that the first section of the second fastener conduit portion is a fastener transfer area, and the second section of the second fastener conduit portion is a fastener queuing area.

25. A fastener magazine comprising an in-line fastener selection device, the in-line fastener selection device comprising fastener conduit having a first fastener conduit portion and a second fastener conduit portion, and an escapement mechanism located between the first and second fastener conduit portions;

wherein the escapement mechanism has:
a first configuration in which a first barrier portion of the escapement mechanism is configured to block the passage of a leading fastener from a first section of the second fastener conduit portion to the first fastener conduit portion;
a second configuration in which the first barrier portion of the escapement mechanism is configured to permit the passage of the leading fastener from the first section of the second fastener conduit portion to the first fastener conduit portion, and a second barrier portion of the escapement mechanism is configured to block the passage of a trailing fastener from a second section of the second fastener conduit portion to the first section of the second fastener conduit portion; and
a third configuration in which the second barrier portion of the escapement mechanism is configured to permit the passage of the trailing fastener from the second section of the second fastener conduit portion to the first section of the second fastener conduit portion, and the first or second barrier portion of the escapement mechanism is configured to block the passage of the trailing fastener from the first section of the second fastener conduit portion to the first fastener conduit portion.

26. The fastener magazine of claim 25, wherein the fastener magazine is a removable fastener magazine.

27. A method of selecting a fastener using an in-line fastener selection device comprising fastener conduit having a first fastener conduit portion and a second fastener conduit portion, and an escapement mechanism located between the first and second fastener conduit portions,
wherein the method comprises:
placing the escapement mechanism in a first configuration in which a first barrier portion of the escapement mechanism blocks the passage of a leading fastener from a first section of the second fastener conduit portion to the first fastener conduit portion;
placing the escapement mechanism in a second configuration in which the first barrier portion of the escapement mechanism permits the passage of the leading fastener from the first section of the second fastener conduit portion to the first fastener conduit portion, and a second barrier portion of the escapement mechanism blocks the passage of a trailing fastener from a second section of the second fastener conduit portion to the first section of the second fastener conduit portion; and
placing the escapement mechanism in a third configuration in which the second barrier portion of the escapement mechanism permits the passage of the trailing fastener from the second section of the second fastener conduit portion to the first section of the second fastener conduit portion, and the first or second barrier portion of the escapement mechanism blocks the passage of the trailing fastener from the first section of the second fastener conduit portion to the first fastener conduit portion.

\* \* \* \* \*